US012613832B2

(12) United States Patent
Cooper et al.

(10) Patent No.: US 12,613,832 B2
(45) Date of Patent: Apr. 28, 2026

(54) STORING AND SEARCHING FOR DATA IN DATA STORES

(71) Applicant: FEATURESPACE LIMITED, Cambridge (GB)

(72) Inventors: Simon Cooper, Cambridge (GB); David Excell, Cambridge (GB)

(73) Assignee: Featurespace Limited, Cambridge (GB)

( * ) Notice: Subject to any disclaimer, the term of this patent is extended or adjusted under 35 U.S.C. 154(b) by 0 days.

(21) Appl. No.: 17/788,560

(22) PCT Filed: Oct. 29, 2021

(86) PCT No.: PCT/IB2021/060049
§ 371 (c)(1),
(2) Date: Jun. 23, 2022

(87) PCT Pub. No.: WO2023/073414
PCT Pub. Date: May 4, 2023

(65) Prior Publication Data
US 2024/0264977 A1    Aug. 8, 2024

(51) Int. Cl.
G06F 16/14        (2019.01)
G06F 16/215       (2019.01)
G06Q 20/40        (2012.01)

(52) U.S. Cl.
CPC ............ *G06F 16/14* (2019.01); *G06F 16/215* (2019.01); *G06Q 20/4016* (2013.01)

(58) Field of Classification Search
CPC ........ G06F 16/14; G06F 16/215; G06F 16/23; G06Q 20/4016

USPC ......................................................... 707/758
See application file for complete search history.

(56) References Cited

U.S. PATENT DOCUMENTS

| | | | | |
|---|---|---|---|---|
| 9,516,053 | B1* | 12/2016 | Muddu | ............... G06F 3/04847 |
| 10,169,433 | B2* | 1/2019 | Lerios | ................... G06F 16/254 |
| 10,699,190 | B1 | 6/2020 | Rotem et al. | |
| 10,768,973 | B1 | 9/2020 | Jin | |

(Continued)

FOREIGN PATENT DOCUMENTS

| | | |
|---|---|---|
| DE | 102019110721 | 10/2020 |
| EP | 1879120 | 1/2008 |

(Continued)

OTHER PUBLICATIONS

International Search Report for PCT/IB2021/060049, issued Aug. 12, 2022.

(Continued)

*Primary Examiner* — Hicham Skhoun
(74) *Attorney, Agent, or Firm* — King & Spalding LLP

(57)        ABSTRACT

A data item is searched for in first and/or second data sets of a data store. If it is found in the first data set and if it was updated in the first data set after the second data set became an overlay of the first data set, first data stored in association with the data item in the first data set is returned. If it is found in the first and second data sets and if the second data set became an overlay of the first data set after the data item was updated in the first data set, second data stored in association with the data item in the second data set is returned. The second data set is identified based on overlay metadata, indicative of the second data set being an overlay of the first data set.

23 Claims, 32 Drawing Sheets

(56) References Cited

U.S. PATENT DOCUMENTS

| | | | | |
|---|---|---|---|---|
| 2007/0282810 | A1 | 12/2007 | Mueller | |
| 2011/0231524 | A1* | 9/2011 | Lin | G06F 3/0667 |
| | | | | 709/220 |
| 2015/0081694 | A1* | 3/2015 | Friedlander | G06F 16/9024 |
| | | | | 707/736 |
| 2016/0004742 | A1* | 1/2016 | Mohan | G06F 16/2365 |
| | | | | 707/694 |
| 2016/0103838 | A1 | 4/2016 | Sainani | |
| 2017/0192892 | A1* | 7/2017 | Pundir | G06F 3/0644 |
| 2017/0235820 | A1* | 8/2017 | Conrad | G06F 40/295 |
| | | | | 707/728 |
| 2018/0011917 | A1* | 1/2018 | Mueller | G06F 16/284 |
| 2019/0354544 | A1* | 11/2019 | Hertz | G06N 5/025 |
| 2020/0315432 | A1* | 10/2020 | Tully | H04N 23/55 |
| 2020/0342290 | A1* | 10/2020 | Carothers | G06N 3/063 |
| 2021/0103930 | A1 | 4/2021 | Fu et al. | |
| 2021/0157643 | A1 | 5/2021 | Shear et al. | |
| 2021/0192524 | A1 | 6/2021 | Saleh et al. | |
| 2021/0279280 | A1* | 9/2021 | M G | G06F 16/2246 |
| 2021/0365816 | A1* | 11/2021 | Sears | H04L 63/1425 |
| 2021/0390385 | A1* | 12/2021 | Saleh | G06N 3/084 |
| 2022/0291590 | A1* | 9/2022 | Su | G03F 7/70508 |
| 2023/0037894 | A1* | 2/2023 | Arya | G06F 40/40 |
| 2023/0152762 | A1 | 5/2023 | Ramanasankaran | |
| 2024/0260966 | A1* | 8/2024 | Shelton, IV | A61B 34/25 |
| 2025/0063059 | A1* | 2/2025 | Annen | H04L 63/1416 |

FOREIGN PATENT DOCUMENTS

| | | |
|---|---|---|
| FR | 3090960 | 6/2020 |
| JP | 2007272675 | 10/2017 |
| JP | 2018530817 | 9/2019 |

OTHER PUBLICATIONS

International Search Report for PCT /IB2022/050896, issued Sep. 30, 2022.

Pandey Kshitij et al: "A Review of Credit Card Fraud Detection Techniques," 2021 5th International Conference on Computing Methodologies and Communication, Apr. 8, 2021, pp. 1645-1653.

Prusti Debachudamani et al: "Credit Card Fraud Detection Technique by Applying Graph Database Model", Arabian Journal for Science and Engineering, Springer Berlin Heidelberg, Berlin/Heidelberg, vol. 46, No. 9, May 4, 2021 (May 4, 2021), pp. 1-20.

International Search Report for PCT/IB2021/057080, issued Mar. 27, 2023.

Examination Report issued for European Patent Application No. 22706385.6, issued Jun. 1, 2023.

Branco Bernardo et al. "Interleaved Sequence RNNs for Fraud Detection", Proceedings of the 26th ACM SIGKDD International Conference on Knowledge Discovery & Data Mining, ACMPUB27, New York, NY, USA, Aug. 23, 2020 (Aug. 23, 2020), pp. 3101-3109.

Examination Report issued for European Patent Application No. 21810114.5, issued Jul. 3, 2023.

Summons to Attend Oral Proceedings for European Patent Application No. 21810114.5, issued Dec. 12, 2023.

International Search Report for PCT/IB2021/066049, issued Aug. 8, 2022.

Search Report for BG Patent Application No. GB 2211132.2 issued Dec. 12, 2022.

* cited by examiner

600

608

700

900

1000 root

1300

1302

E1: 30
E2: 80
E3: 60
E4: 65

1313 created
at 100

1314        root time

1400

1500

1702

STORING AND SEARCHING FOR DATA IN DATA STORES

CROSS REFERENCE TO RELATED APPLICATIONS

This application is a national phase application under 35 U.S.C. § 371 of Patent Cooperation Treaty International Application No. PCT/IB2021/060049, filed Oct. 29, 2021, which is hereby fully incorporated herein by reference.

TECHNICAL FIELD

The present invention relates to measures to store and search for data in a data store. Such data may be machine learning system model data, i.e. data for a machine learning model used by a machine learning system. Examples of such data include, but are not limited to, parameter data and/or state data for the machine learning model. The machine learning system may be a real-time transaction processing system.

BACKGROUND

Digital payments have exploded over the last twenty years, with more than three-quarters of global payments using some form of payment card or electronic wallet. Point of sale systems are progressively becoming digital rather than cash-based. Put simply, global systems of commerce are now heavily reliant on electronic data processing platforms. This presents many engineering challenges that are primarily hidden from a lay user. For example, digital transactions need to be completed in real-time, i.e. with a minimal level of delay experienced by computer devices at the point of purchase. Digital transactions also need to be secure and resistant to attack and exploitation. The processing of digital transactions is also constrained by the historic development of global electronic systems for payments. For example, much infrastructure is still configured around models that were designed for mainframe architectures in use over 50 years ago.

As digital transactions increase, new security risks also become apparent. Digital transactions present new opportunities for fraud and malicious activity. In 2015, it was estimated that 7% of digital transactions were fraudulent, and that figure has only increased with the transition of more economic activity online. Fraud losses are growing.

While risks like fraud are an economic issue for companies involved in commerce, the implementation of technical systems for processing transactions is an engineering challenge. Traditionally, banks, merchants and card issuers developed "paper" rules or procedures that were manually implemented by clerks to flag or block certain transactions. As transactions became digital, one approach to building technical systems for processing transactions has been to supply computer engineers with these sets of developed criteria and to ask the computer engineers to implement them using digital representations of the transactions, i.e. convert the hand-written rules into coded logic statements that may be applied to electronic transaction data. This traditional approach has run into several problems as digital transaction volumes have grown. First, any applied processing needs to take place at "real-time", e.g. with millisecond latencies. Second, many thousands of transactions need to be processed every second (e.g., a common "load" may be 1000-2000 per second), with load varying unexpectedly over time (e.g., a launch of a new product or a set of tickets can easily increase an average load level by several multiples). Third, the digital storage systems of transaction processors and banks are often siloed or partitioned for security reasons, yet digital transactions often involve an interconnected web of merchant systems. Fourthly, large scale analysis of actual reported fraud and predicted fraud is now possible. This shows that traditional approaches to fraud detection are found wanting; accuracy is low and false positives are high. This then has a physical effect on digital transaction processing, more genuine point-of-sale and online purchases are declined and those seeking to exploit the new digital systems often get away with it.

In the last few years, a more machine learning approach has been taken to the processing of transaction data. As machine learning models mature in academia, engineers have begun to attempt to apply them to the processing of transaction data. However, this again runs into problems. Even if engineers are provided with an academic or theoretical machine learning model and asked to implement it, this is not straightforward. For example, the problems of large-scale transaction processing systems come into play. Machine learning models do not have the luxury of unlimited inference time as in the laboratory. This means that it is simply not practical to implement certain models in a real-time setting, or that they need significant adaptation to allow real-time processing in the volume levels experienced by real-world servers. Moreover, engineers need to contend with the problem of implementing machine learning models on data that is siloed or partitioned based on access security, and in situations where the velocity of data updates is extreme. The problems faced by engineers building transaction processing systems may thus be seen as being akin to those faced by network or database engineers; machine learning models need to be applied but meeting system throughput and query response time constraints set by the processing infrastructure. There are no easy solutions to these problems. Indeed, the fact that many transaction processing systems are confidential, proprietary, and based on old technologies means that engineers do not have the body of knowledge developed in these neighbouring fields and often face challenges that are unique to the field of transaction processing. Moreover, the field of large-scale practical machine learning is still young, and there are few established design patterns or textbooks that engineers can rely on.

As indicated above, engineers building transaction processing systems may face problems akin to those faced by database engineers. Examples of such database-related problems include, but are not limited to, creation, configuration, management, maintenance, use, structure, optimisation, security and organisation. However, the demands of databases for use in transaction processing systems, especially those implementing machine learning systems and providing real-time processing, can be significantly different from database demands in other technical fields. For example, such transaction processing systems may need to provide one or more of: (i) real-time database reading capabilities, (ii) high availability for "online" transaction processing capabilities with limited or no downtime for database management, (iii) the ability to handle significant amounts of state data that can build up quickly, (iv) high stability and reliability, (v) data security, and (vi) the ability to handle access from multiple different clients.

Copy-on-write snapshots are a staple feature of most existing database systems. In addition, in existing database systems, a new set of data can be copied on top of an existing set of data. However, the latter scales linearly with the size of the new set of data. Additionally, in existing database systems, large modifications cannot be done atomically, or concurrently with other clients accessing the same set of data.

BRIEF DESCRIPTION OF THE DRAWINGS

Examples of the invention will now be described, by way of example only, with reference to the accompanying drawings, in which.

DETAILED DESCRIPTION

Introduction

Figure 1A:
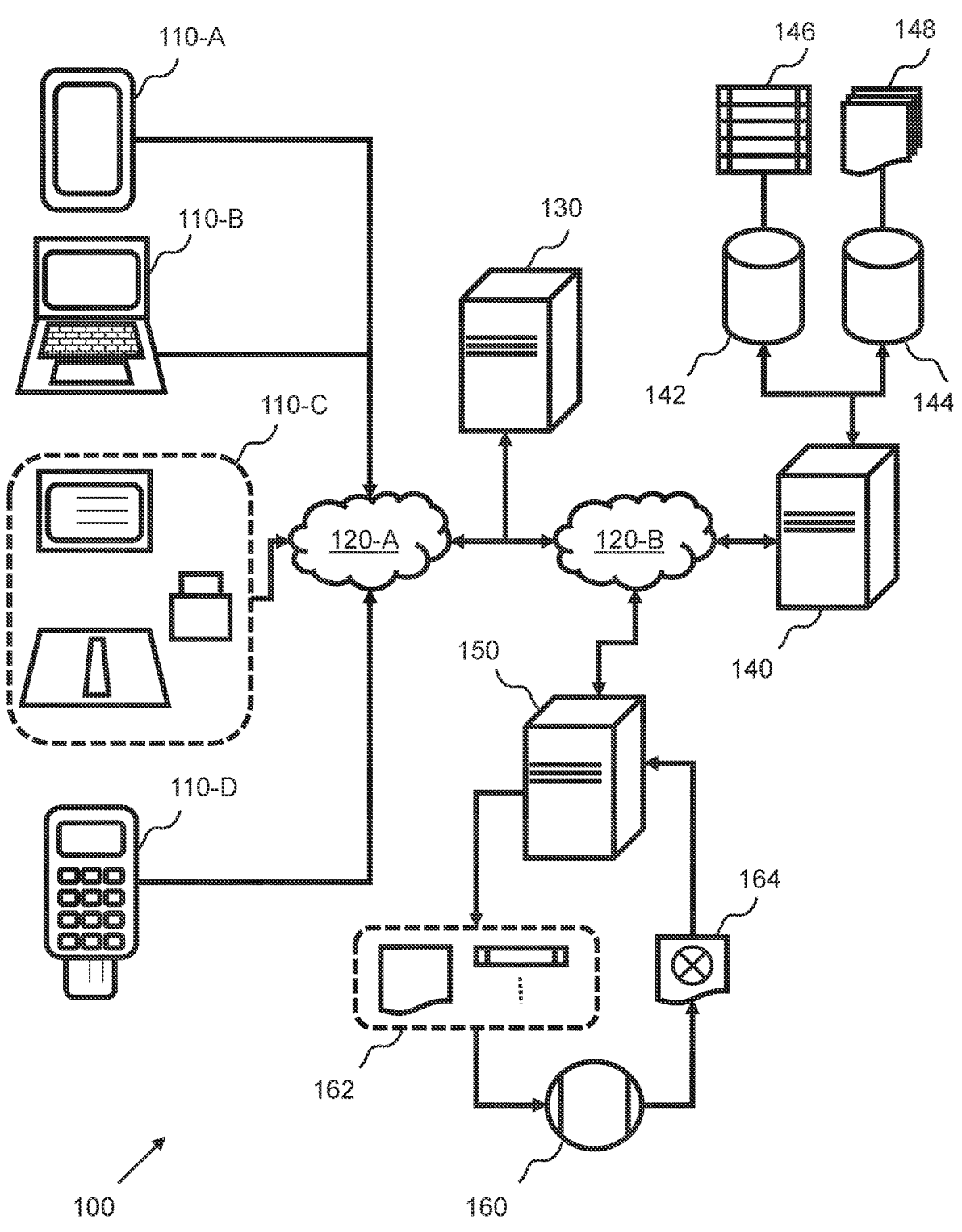
FIGS. 1A to 1C are schematic diagrams showing different example electronic infrastructures for transaction processing.

Certain examples described herein relate to measures for use in a machine learning system for use in transaction processing. In certain examples, a machine learning system is applied in real-time, high-volume transaction processing pipelines to provide an indication of whether a transaction or entity matches previously observed and/or predicted patterns of activity or actions, e.g. an indication of whether a transaction or entity is "normal" or "anomalous". The term "behavioural" is used herein to refer to this pattern of activity or actions. The indication may comprise a scalar value normalised within a predefined range (e.g., 0 to 1) that is then useable to prevent fraud and other misuse of payment systems. The machine learning systems may apply machine learning models that are updated as more transaction data is obtained, e.g. that are constantly trained based on new data, so as to reduce false positives and maintain accuracy of the output metric. Examples described herein relate to improved handling of such data, for example in terms of searching for and storing such data in one or more data stores. The present examples may be particularly useful for preventing fraud in cases where the physical presence of a payment card cannot be ascertained (e.g., online transactions referred to as "card-not-present") or for commercial transactions where high-value transactions may be routine and where it may be difficult to classify patterns of behaviour as "unexpected". As such, the present examples facilitate the processing of transactions as these transactions to being primarily "online", i.e. conducted digitally over one or more public communications networks.

Certain examples described herein allow machine learning models to be tailored to be specific to certain entities, such as account holders and merchants. For example, the machine learning models may model entity-specific patterns of behaviour as opposed to general group or aggregate behaviour that results in poor accuracy. The measures and machine learning systems described herein are able to provide dynamically updating machine learning models despite large transaction flows and/or despite the need for segregation of different data sources. Again, examples described herein provide improved measures for reading and storing machine learning model data to be used in such machine learning models.

The present examples may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

The present example machine learning systems, e.g. as configured and/or as trained according to FIGS. 1A to 18 below, allow for fast inference that can be easily parallelised to provide second or sub-second processing latencies and to manage large processing volumes (e.g., billions of transactions a year).

More specifically, examples described herein enable multiple diverging sets of data to be stored in a data store (such as a database), based on a common historical set of data, without the historical data being duplicated. Examples enable one set of data to be replaced logically with another set of data, without all data from one set being copied on top of the data in another set. Examples enable making a new set of data accessible to a client as a single atomic operation, without requiring the data to be copied within a data store. Where such data comprises machine learning model data, machine learning system processing latencies can be reduced, and throughput can be increased. As will be explained in more detail below, various measures are provided which make most data changes visible as part of a single atomic change to "state id" metadata. For example, a large set of data can be copied into a data set that is separate from a "live" data set used by running processes, as opposed to being copied into the live data set. The separate data set can have a state id that is different from, and independent of, a live state id used by the live data set. The new state id of the new data set can be made visible atomically to existing processes by setting the new data set as an overlay of the live data set, and notifying clients of the state metadata change. Clients can then read data from the amalgam of the live and new data sets, rather than requiring a manual copy operation to be performed before the data can be read from a single combined data set. Maintaining separate data sets in this manner also reduces the risk of inadvertent and undesired changes to the live data set, which could negatively affect transaction processing for example.

Certain Term Definitions

The term "data" is used in different contexts herein to refer to digital information, such as, but not limited to, that represented by known bit structures within one or more programming languages. In use, data may refer to digital information that is stored as bit sequences within computer memory. Certain machine learning models may operate on structured arrays of data of a predefined bit format. Using terms of the art, these may be referred to a multidimensional arrays or "tensors". It should be noted that for machine learning methods multidimensional arrays, e.g. with a defined extent in multiple dimensions, may be "flattened" so as to be represented (e.g., within memory) as a sequence or vector of values stored according to the predefined format (e.g., n-bit integer or floating point number, signed or unsigned). Hence, the term "tensor" as used herein covers multidimensional arrays with one or more dimensions (e.g., vectors, matrixes, volumetric arrays etc). Data may, however, take other forms.

The term "structured numeric representation" is used to refer to numeric data in a structured form, such as an array of one or more dimensions that stores numeric values with a common data type, such as integers or float values. A structured numeric representation may comprise a tensor (as used within machine learning terminology). A structured numeric representation is typically stored as a set of indexed and/or consecutive memory locations, e.g. a one-dimensional array of 64-bit floats may be represented in computer memory as a consecutive sequence of 64-bit memory locations in a 64-bit computing system.

The term "transaction data" is used herein to refer to electronic data that is associated with a transaction. A transaction comprises a series of communications between different electronic systems to implement a payment or exchange. In general, transaction data may comprise data indicating events (e.g., actions undertaken in time) that relate to, and may be informative for, transaction processing. Transaction data may comprise structured, unstructured and semi-structured data. In certain cases, transaction data may be used broadly to refer to actions taken with respect to one or more electronic devices. Transaction data may take a variety of forms depending on the precise implementation. However, different data types and formats may be converted by pre or post processing as appropriate.

The term "interface" is used herein to refer to any physical and/or logical interface that allows for one or more of data input and data output. An interface may be implemented by a network interface adapted to send and/or receive data, or by retrieving data from one or more memory locations, as implemented by a processor executing a set of instructions. An interface may also comprise physical (network) couplings over which data is received, such as hardware to allow for wired or wireless communications over a particular medium. An interface may comprise an application programming interface and/or a method call or return. For example, in a software implementation, an interface may comprise passing data and/or memory references to a function initiated via a method call, where the function comprises computer program code that is executed by one or more processors; in a hardware implementation, an interface may comprise a wired interconnect between different chips, chipsets or portions of chips. In the drawings, an interface may be indicated by a boundary of a processing block that has an inward and/or outward arrow representing a data transfer.

The terms "component" and "module" are used interchangeably to refer to either a hardware structure that has a specific function (e.g., in the form of mapping input data to output data) or a combination of general hardware and specific software (e.g., specific computer program code that is executed on one or more general purpose processors). A component or module may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor.

The term "machine learning model" is used herein to refer to at least a hardware-executed implementation of a machine learning model or function. Known models within the field of machine learning include logistic regression models, Naïve Bayes models, Random Forests, Support Vector Machines and artificial neural networks. Implementations of classifiers may be provided within one or more machine learning programming libraries including, but not limited to, scikit-learn, TensorFlow, and PyTorch.

The term "map" is used herein to refer to the transformation or conversion of a first set of data values to a second set of data values. The two sets of data values may be arrays of different sizes, with an output array being of lower dimensionality than an input array. The input and output arrays may have common or different data types. In certain examples, the mapping is a one-way mapping to a scalar value.

The term "data store" is used herein to refer to a repository for storing data. An example of a data store is a database. However, data stores may take different forms, for example depending on implementation details. Another example type of data store is a file storage system.

The term "data set" is used herein to refer to a collection of data. A data set may be empty, for example on its creation.

The term "data item" is used herein to refer to information being searched for in a data store. A data item may uniquely identify a record in a data store. The terms "key" and "search key" may be used herein interchangeably with the term "data item". Data may be stored in association with a data item in a data store.

The term "data element" is used herein to relate to the whole or part of given data stored in the data store. Data may comprise one or more data elements in this respect.

The term "metadata" is used herein to relate to information that provides information about other data. Metadata may be stored in the same data store as state data or may be stored in a different data store.

Example Transaction Processing System

Figure 1B:
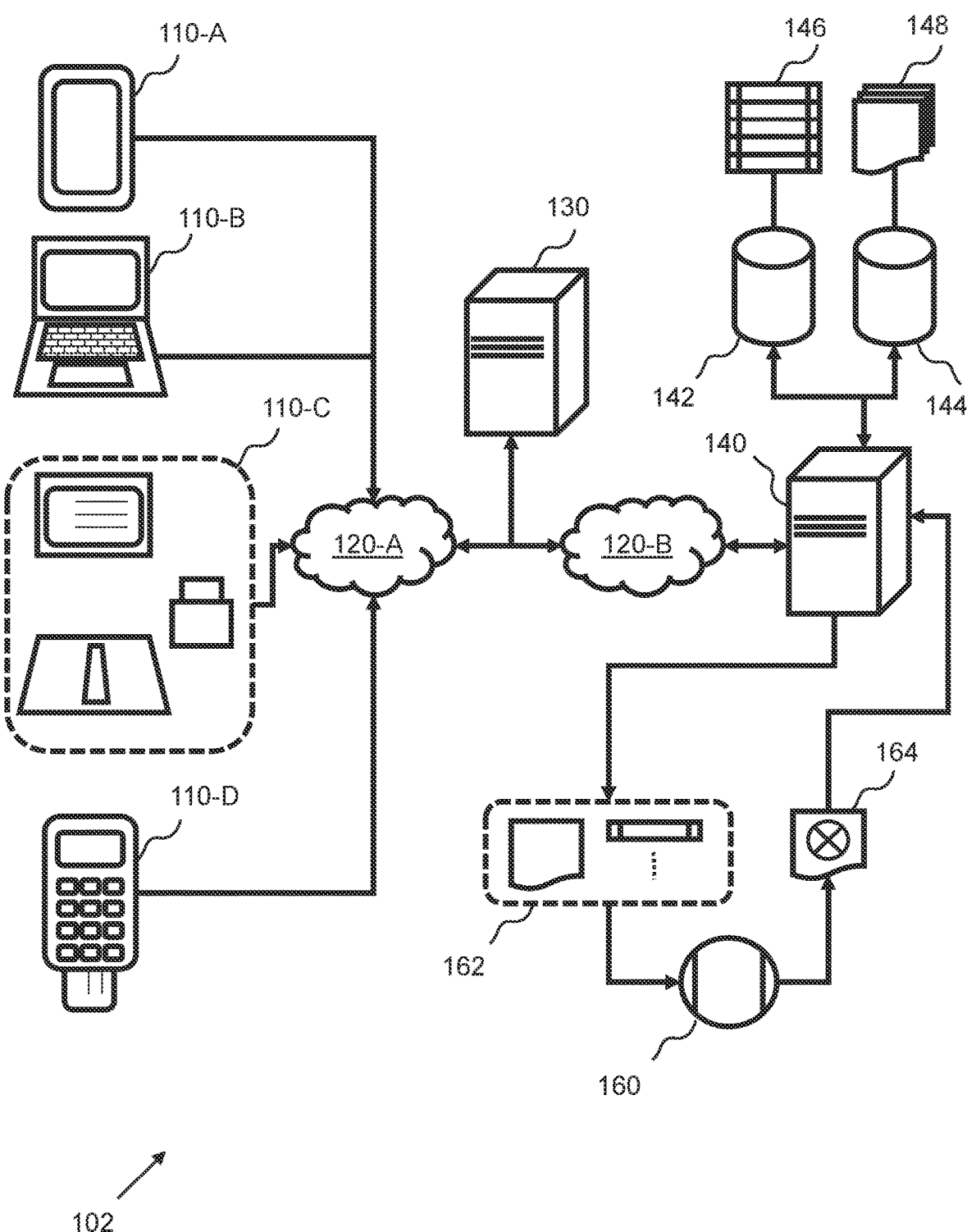
Figure 1C:
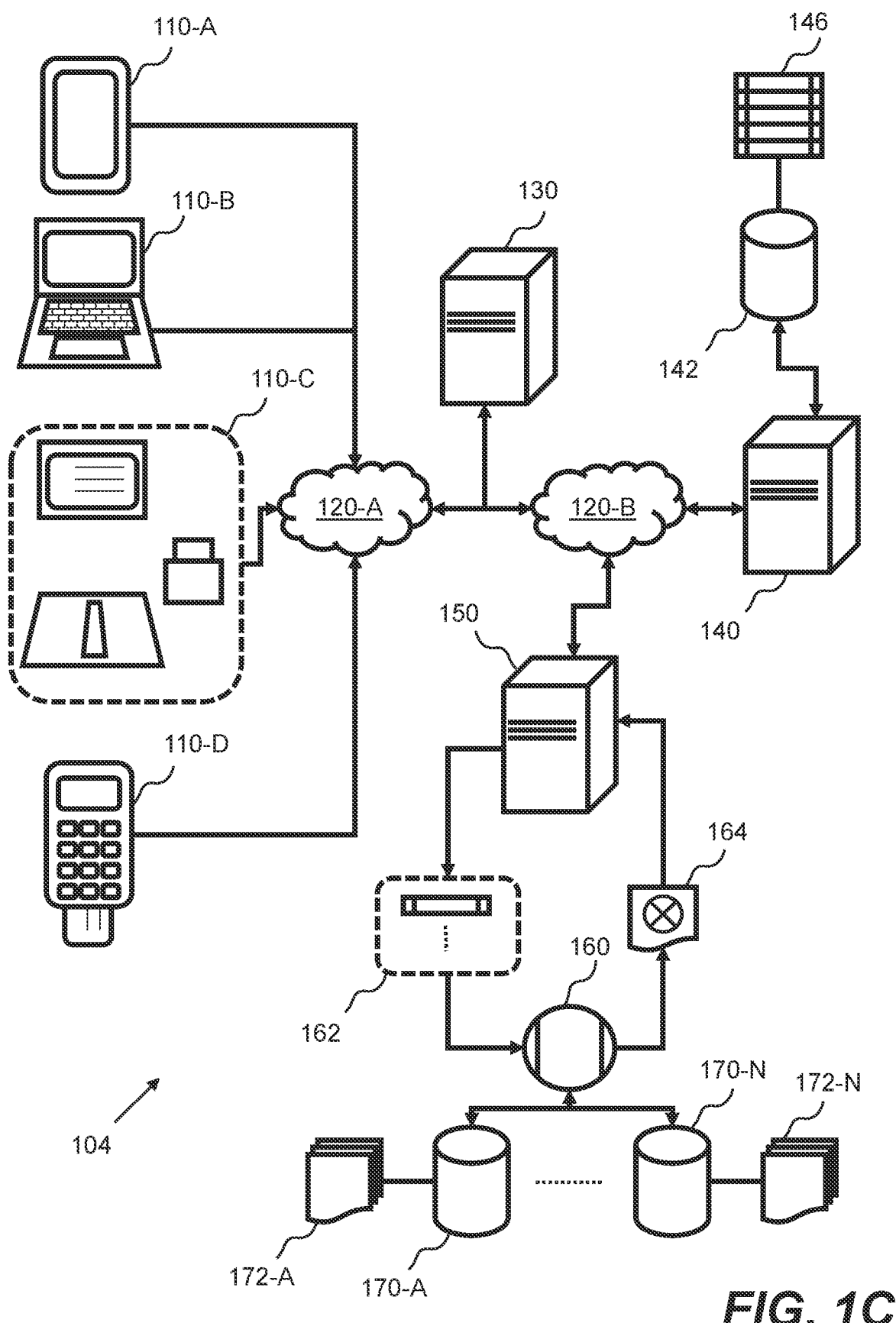

FIGS. 1A to 1C show a set of example transaction processing systems 100, 102, 104. These example transaction processing systems are described to provide context for the inventions discussed herein but should not be seen as limiting; the configuration of any one implementation may differ based on the specific requirements of that implementation. However, the described example transaction processing systems allow those skilled in the art to identify certain high-level technical features that are relevant for the description below. The three example transaction processing systems 100, 102, 104 show different areas where variation may occur.

FIGS. 1A to 1C show a set of client devices 110 that are configured to initiate a transaction. In this example, the set of client devices 110 comprise a smartphone 110-A, a computer 110-B, a point-of-sale (POS) system 110-C and a portable merchant device 110-D. These client devices 110 provide a set of non-exhaustive examples. Generally, any electronic device or set of devices may be used to undertake a transaction. In one case, the transaction comprises a purchase or payment. For example, the purchase or payment may be an online or mobile purchase or payment made by way of the smartphone 110-A or the computer 110-B, or may be a purchase or payment made at a merchant premises, such as via the POS system 110-C or the portable merchant device 110-D. The purchase or payment may be for goods and/or services.

In FIGS. 1A to 1C, the client devices 110 are communicatively coupled to one or more computer networks 120. The client devices 110 may be communicatively coupled in a variety of ways, including by one or more wired and/or wireless networks including telecommunications networks. In preferred examples, all communications across the one or more computer networks are secured, e.g. using Transport Layer Security (TLS) protocols. In FIG. 1A, two computer networks are shown 120-A and 120-B. These may be separate networks or different portions of a common network. The first computer network 120-A communicatively couples the client devices 110 to a merchant server 130. The merchant server 130 may execute a computer process that implements a process flow for the transaction. For example, the merchant server 130 may be a back-end server that handles transaction requests received from the POS system 110-C or the portable merchant device 110-D or may be used by an online merchant to implement a website where purchases may be made. It will be appreciated that the examples of FIGS. 1A to 1C are necessary simplifications of actual architectures; for example, there may be several interacting server devices that implement an online merchant, including separate server devices for providing HyperText Markup Language (HTML) pages detailing a product and/or service and for handling a payment process.

In FIG. 1A, the merchant server 130 is communicatively coupled to a further set of back-end server devices to process the transaction. In FIG. 1A, the merchant server 130 is communicatively coupled to a payment processor server 140 via a second network 120-B. The payment processor server 140 is communicatively coupled to a first data storage device 142 storing transaction data 146 and a second data storage device 144 storing ancillary data 148. The transaction data 146 may comprise batches of transaction data relating to different transactions that are undertaken over a period of time. The ancillary data 148 may comprise data associated with the transactions, such as records storing merchant and/or end user data. In FIG. 1A, the payment processor server 140 is communicatively coupled to a machine learning server 150 via the second network 120-B. The machine learning server 150 implements a machine learning system 160 for the processing of transaction data. The machine learning system 160 is arranged to receive input data 162 and to map this to output data 164 that is used by the payment processor server 140 to process a particular transaction, such as one arising from the client devices 110. In one case, the machine learning system 160 receives at least transaction data associated with the particular transaction and provides an alert or numeric output that is used by the payment processor server 140 to determine whether the transaction is to be authorised (i.e., approved) or declined. As such, the output of the machine learning system 160 may comprise a label, alert or other indication of fraud, or general malicious or anomalous activity. The output may comprise a probabilistic indication, such as a score or probability. In one case, the output data 164 may comprise a scalar numeric value. The input data 162 may further comprise data derived from one or more of the transaction data 146 and the ancillary data 148. In one case, the output data 164 indicates a level of deviation from a specific expected pattern of behaviour based on past observations or measurements. For example, this may indicate fraud or criminal behaviour as this often differs significantly from observed patterns of behaviour, especially on a large scale. The output data 164 may form a behavioural measure. The expected pattern of behaviour may be defined, either explicitly or implicitly, based on observed interactions between different entities within the transaction process flow, such as end users or customers, merchants (including point-of-sale and back-end locations or entities where these may differ), and banks.

The machine learning system 160 may be implemented as part of a transaction processing pipeline. An example transaction processing pipeline is described later with respect to FIGS. 5A and 5B. A transaction processing pipeline may comprise electronic communications between the client devices 110, merchant server 130, payment processor server 140 and machine learning server 150. Other server devices may also be involved, such as banking servers that provide authorisation from an issuing bank. In certain cases, client devices 110 may directly communicate with the payment processor server 140. In use, a transaction processing pipeline typically needs to be completed within one or two hundred milliseconds. In general, sub-second processing times may be deemed real-time (e.g., human beings typically perceive events on a timespan of 400 ms). Furthermore, 100-200 ms may be the desired maximum latency of the full round-trip-time for transaction processing; within this timespan, the time allotted for the machine learning system 160 may be a small fraction of this full amount, such as 10 ms (i.e., less that 5-10% of the target processing time), as most of the time may be reserved for other operations in the transaction processing flow. This presents a technical constraint for the implementation of the machine learning system 160. Furthermore, in real-world implementations, average processing volumes may be on the order of 1000-2000 a second. This means that most "off-the-shelf" machine learning systems are not suitable to implement machine learning system 160. It further means that most machine learning approaches described in academic papers cannot be implemented within the aforementioned transaction processing pipeline without non-obvious adaptations. There is also a problem that anomalies are, by their very nature, rare events and so accurate machine learning systems are difficult to train.

FIG. 1B shows a variation 102 of the example transaction processing system 100 of FIG. 1A. In this variation 102, the machine learning system 160 is implemented within the payment processor computer infrastructure, e.g. executed by the payment processor server 140 and/or executed on a locally coupled server within the same local network as the payment processor server 140. The variation 102 of FIG. 1B may be preferred for larger payment processors as it allows faster response times, greater control, and improved security. However, functionally, the transaction processing pipeline may be similar to that of FIG. 1A. For example, in the example of FIG. 1A, the machine learning system 160 may be initiated by a secure external application programming interface (API) call, such as a Representation State Transfer (REST) API call using Hypertext Transfer Protocol Secure (HTTPS), while in FIG. 1B, the machine learning system 160 may be initiated by an internal API call, but where a common end API may handle both requests (e.g., the REST HTTPS API may provide an external wrapper for the internal API).

FIG. 1C shows another variation 104 of the example transaction processing system 100 of FIG. 1A. In this variation 104, the machine learning system 160 is communicatively coupled to local data storage devices 170. For example, data storage devices 170 may be on the same local network as machine learning server 150 or may comprise a local storage network accessible to the machine learning server 150. In this case, there are a plurality of local data storage devices 170-A to 170-N, where each data storage device stores partitioned ancillary data 172. The partitioned ancillary data 172 may comprise parameters for one or more machine learning models. In one case, the ancillary data 172 may comprise a state for machine learning models, where the state may relate to one or more specific entities such as a user or merchant. The partitioning of the ancillary data 172 may need to be applied to meet security requirements set by a third party, such as the payment processor, one or more banks and/or one or more merchants. In use, the machine learning system 160 accesses the ancillary data 172-A to 172-N via the plurality of local data storage devices 170-A to 170-N based on the input data 162. For example, the input data 162 may be received by way of an API request from a particular source and/or may comprise data that identifies that a particular partition is to be used to handle the API request. More details of different storage systems that may be applied to meet security requirements are set out in FIGS. 2A and 2B.

Example Data Storage Configurations

Figures 2A, 2B:
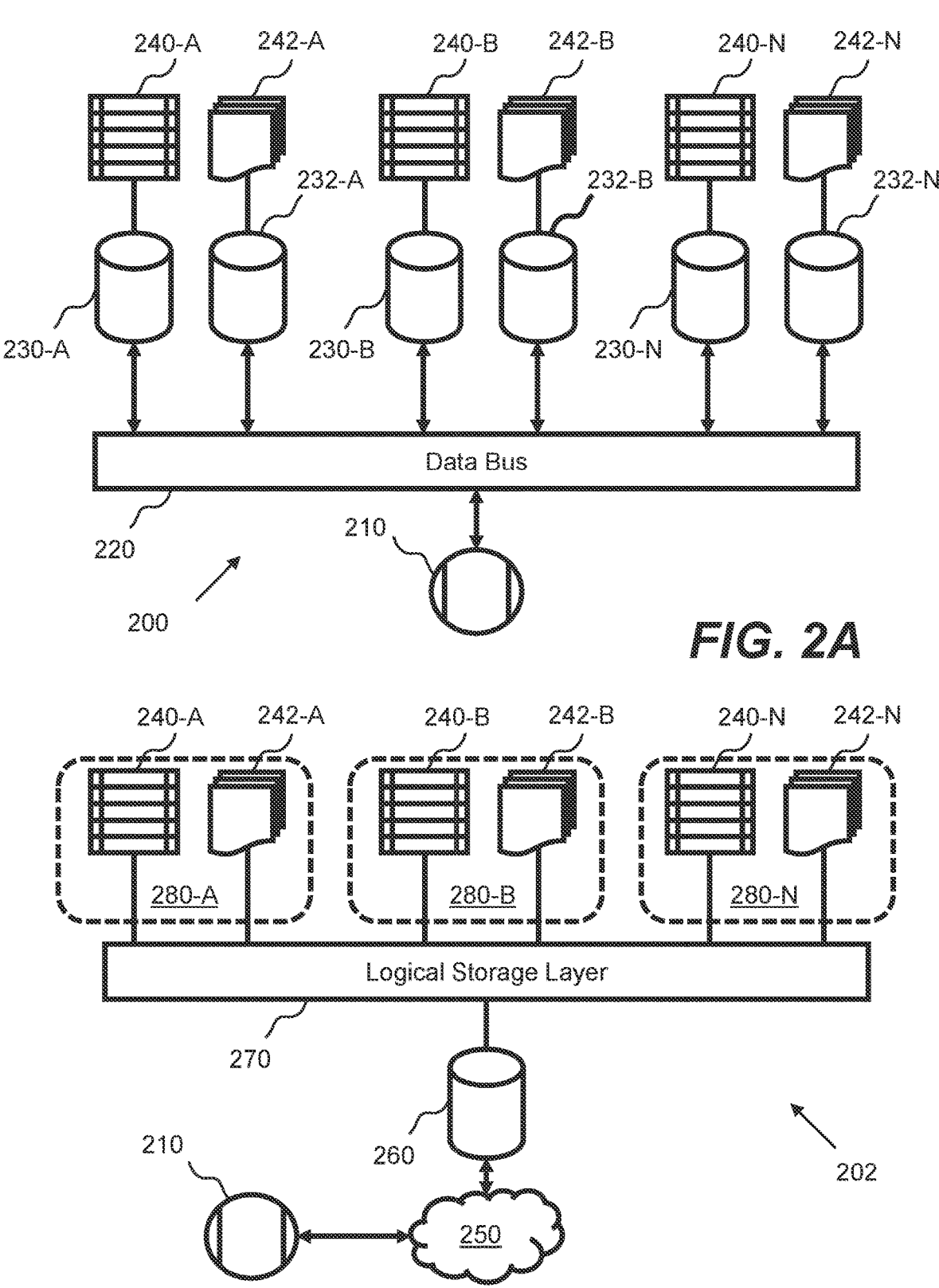
FIGS. 2A and 2B are schematic diagrams showing different examples of data storage systems for use by a machine learning transaction processing system.

FIGS. 2A and 2B show two example data storage configurations 200 and 202 that may be used by an example machine learning system 210 for the processing of transaction data. The examples of FIGS. 2A and 2B are two non-limiting examples that show different options available for implementations, and particular configurations may be selected according to individual circumstances. The machine learning system 210 may comprise an implementation of the machine learning system 160 described in the previous examples of FIGS. 1A to 1C. The examples of FIGS. 2A and 2B allow for the processing of transaction data that is secured using heterogeneous cryptographic parameters, e.g. for the machine learning system 210 to securely process transaction data for heterogeneous entities. It will be appreciated that the configurations of FIGS. 2A and 2B may not be used if the machine learning system 160 is implemented for a single set of secure transaction and ancillary data, e.g. within an internal transaction processing system or as a hosted system for use by a single payment processor.

FIG. 2A shows a machine learning system 210 communicatively coupled to a data bus 220. The data bus 220 may comprise an internal data bus of the machine learning server 150 or may form part of storage area network. The data bus 220 communicatively couples the machine learning system 210 to a plurality of data storage devices 230, 232. The data storage devices 230, 232 may comprise any known data storage device such as magnetic hard disks and solid-state devices. Although data storage devices 230, 232 are shown as different devices in FIG. 2A they may alternatively form different physical areas or portions of storage within a common data storage device. In FIG. 2A, the plurality of data storage devices 230, 232 store historical transaction data 240 and ancillary data 242. In FIG. 2A, a first set of data storage devices 230 store historical transaction data 240 and a second set of data storage devices 232 store ancillary data 242. Ancillary data 242 may comprise one or more of model parameters for a set of machine learning models (such as trained parameters for a neural network architecture and/or configuration parameters for a random forest model) and state data for those models. In one case, the different sets of historical transaction data 240-A to N and ancillary data 242-A to N are associated with different entities that securely and collectively use services provided by the machine learning system 210, e.g. these may represent data for different banks that need to be kept separate as part of the conditions of providing machine learning services to those entities.

FIG. 2B shows another way different sets of historical transaction data 240-A to N and ancillary data 242-A to N may be stored. In FIG. 2B the machine learning system 210 is communicatively coupled, via data transfer channel 250, to at least one data storage device 260. The data transfer channel 250 may comprise a local storage bus, local storage area network, and/or remote secure storage coupling (e.g., as overlaid over insecure networks such as the Internet). In FIG. 2B, a secure logical storage layer 270 is provided using the physical data storage device 260. The secure logical storage layer 270 may be a virtualized system that appears as separate physical storage devices to the machine learning system 210 while actually being implemented independently upon the at least one data storage device 260. The logical storage layer 270 may provide separate encrypted partitions 280 for data relating to groups of entities (e.g., relating to different issuing banks etc.) and the different sets of historical transaction data 240-A to N and ancillary data 242-A to N may be stored in the corresponding partitions 280-A to N. In certain cases, entities may be dynamically created as transactions are received for processing based on data stored by one or more of the server systems shown in FIGS. 1A to 1C.

Example Transaction Data

Figure 3A:
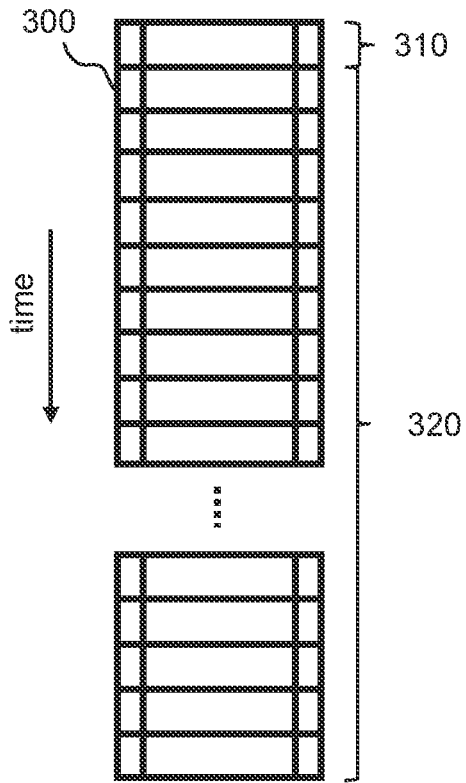
FIGS. 3A and 3B are schematic diagrams showing different examples of transaction data.
Figure 3B:
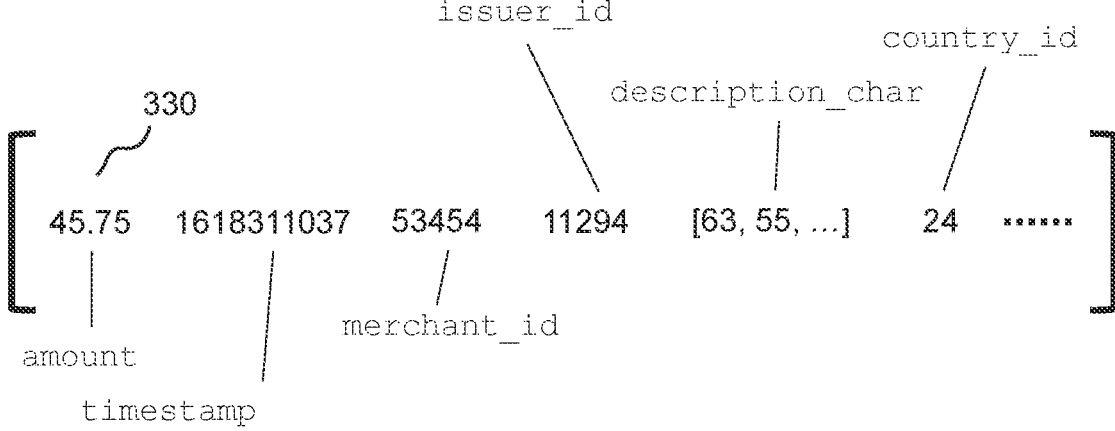

FIGS. 3A and 3B show examples of transaction data that may be processed by a machine learning system such as 160 or 210. FIG. 3A shows how transaction data may comprise a set of records 300, where each record has a timestamp and comprises a plurality of transaction fields. The records 300 may be time-ordered or may be strictly ordered in another manner. In some examples, transaction data may, optionally, be grouped and/or filtered based on the timestamp. For example, FIG. 3A shows a partition of transaction data into current transaction data 310 that is associated with a current transaction and "older" or historical transaction data 320 that is within a predefined time range of the current transaction. The time range may be set as a hyperparameter of any machine learning system. Alternatively, the "older" or historical transaction data 320 may be set as a certain number of transactions. Mixtures of the two approaches are also possible.

FIG. 3B shows how transaction data 330 for a particular transaction may be stored in numeric form for processing by one or more machine learning models. For example, in FIG. 3B, transaction data has at least fields: transaction amount, timestamp (e.g., as a Unix epoch), transaction type (e.g., card payment or direct debit), product description or identifier (i.e., relating to items being purchased), merchant identifier, issuing bank identifier, a set of characters (e.g., Unicode characters within a field of predefined character length), country identifier etc. It should be noted that a wide variety of data types and formats may be received and pre-processed into appropriate numerical representations. In certain cases, originating transaction data, such as that generated by a client device and sent to merchant server 130 is pre-processed to convert alphanumeric data types to numeric data types for the application of the one or more machine learning models. Other fields present in the transaction data can include, but are not limited to, an account number (e.g., a credit card number), a location of where the transaction is occurring, and a manner (e.g., in person, over the phone, on a website) in which the transaction is executed.

Example Machine Learning System

Figure 4:
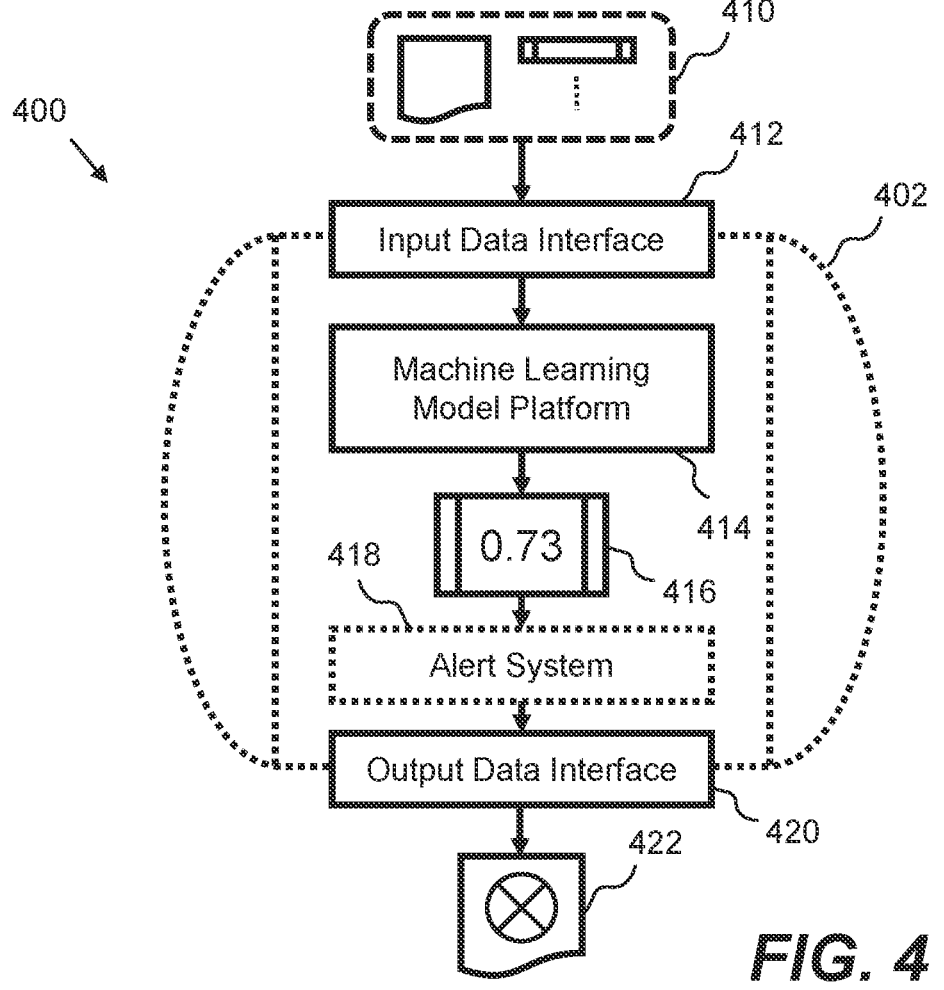
FIG. 4 is a schematic diagram showing example components of a machine learning transaction processing system.

FIG. 4 shows one example 400 of a machine learning system 402 that may be used to process transaction data. Machine learning system 402 may implement one or more of machine learning systems 160 and 210. The machine learning system 402 receives input data 410. The form of the input data 410 may depend on which machine learning model is being applied by the machine learning system 402. In a case where the machine learning system 402 is configured to perform fraud or anomaly detection in relation to a transaction, e.g. a transaction in progress as described above, the input data 410 may comprise transaction data such as 330 (i.e., data forming part of a data package for the transaction) as well as data derived from historical transaction data (such as 300 in FIG. 3A) and/or data derived from ancillary data (such as 148 in FIGS. 1A to 1C or 242 in FIGS. 2A and 2B). The ancillary data may comprise secondary data linked to one or more entities identified in the primary data associated with the transaction. For example, if transaction data for a transaction in progress identifies a user, merchant and one or more banks associated with the transaction (such as an issuing bank for the user and a merchant bank), such as via unique identifiers present in the transaction data, then the ancillary data may comprise data relating to these transaction entities. The ancillary data may also comprise data derived from records of activity, such as interaction logs and/or authentication records. In one case, the ancillary data is stored in one or more static data records and is retrieved from these records based on the received transaction data. Additionally, or alternatively, the ancillary data may comprise machine learning model parameters that are retrieved based on the contents of the transaction data. For example, machine learning models may have parameters that are specific to one or more of the user, merchant and issuing bank, and these parameters may be retrieved based on which of these is identified in the transaction data. For example, one or more of users, merchants, and issuing banks may have corresponding embeddings, which may comprise retrievable or mappable tensor representations for said entities. For example, each user or merchant may have a tensor representation (e.g., a floating-point vector of size 128-1024) that may either be retrieved from a database or other data storage or may be generated by an embedding layer, e.g. based on a user or merchant index.

The input data 410 is received at an input data interface 412. The input data interface 412 may comprise an API interface, such as an internal or external API interface as described above. In one case, the payment processor server 140 as shown in FIGS. 1A to 1C makes a request to this interface, where the request payload contains the transaction data. The API interface may be defined to be agnostic as to the form of the transaction data or its source. The input data interface 412 is communicatively coupled to a machine learning model platform 414. In one case, a request made to the input data interface 412 triggers the execution of the machine learning model platform 414 using the transaction data supplied to the interface. The machine learning model platform 414 is configured as an execution environment for the application of one or more machine learning models to the input data 410. In one case, the machine learning model platform 414 is arranged as an execution wrapper for a plurality of different selectable machine learning models. For example, a machine learning model may be defined using a model definition language (e.g., similar to, or using, markup languages such as eXtended Markup Language—XML). Model definition languages may include (amongst others, independently or in combination), SQL, TensorFlow, Caffe, Thinc and PyTorch. In one case, the model definition language comprises computer program code that is executable to implement one or more of training and inference of a defined machine learning model. The machine learning models may, for example, comprise, amongst others, artificial neural network architectures, ensemble models, regression models, decision trees such as random forests, graph models, and Bayesian networks. The machine learning model platform 414 may define common (i.e., shared) input and output definitions such that different machine learning models are applied in a common (i.e., shared) manner.

In the present example, the machine learning model platform 414 is configured to provide at least a single scalar output 416. This may be normalised within a predefined range, such as 0 to 1. When normalised, the scalar output 416 may be seen as a probability that a transaction associated with the input data 410 is fraudulent or anomalous. In this case, a value of "0" may represent a transaction that matches normal patterns of activity for one or more of a user, merchant and issuing bank, whereas a value of "1" may indicate that the transaction is fraudulent or anomalous, i.e. does not match expected patterns of activity (although those skilled in the art will be aware that the normalised range may differ, such as be inverted or within different bounds, and have the same functional effect). It should be noted that although a range of values may be defined as 0 to 1, output values may not be uniformly distributed within this range, for example, a value of "0.2" may be a common output for a "normal" event and a value of "0.8" may be seen as being over a threshold for a typical "anomalous" or fraudulent event. The machine learning model implemented by the machine learning platform 414 may thus implement a form of mapping between high-dimensionality input data (e.g., the transaction data and any retrieve ancillary data) and a single value output. In one case, for example, the machine learning platform 414 may be configured to receive input data for the machine learning model in a numeric format, wherein each defined machine learning model is configured to map input data defined in the same manner. The exact machine learning model that is applied by the machine learning model platform 414, and the parameters for that model, may be determined based on configuration data. The configuration data may be contained within, and/or identified using, the input data 410 and/or may be set based on one or more configuration files that are parsed by the machine learning platform 414.

In certain cases, the machine learning model platform 414 may provide additional outputs depending on the context. In certain implementations, the machine learning model platform 414 may be configured to return a "reason code" capturing a human-friendly explanation of a machine learning model's output in terms of suspicious input attributes. For example, the machine learning model platform 414 may indicate which of one or more input elements or units within an input representation influenced the model output, e.g. a combination of an "amount" channel being above a learnt threshold and a set of "merchant" elements or units (such as an embedding or index) being outside a given cluster. In cases, where the machine learning model platform 414 implements a decision tree, these additional outputs may comprise a route through the decision tree or an aggregate feature importance based on an ensemble of trees. For neural network architectures, this may comprise layer output activations and/or layer filters with positive activations.

In FIG. 4, certain implementations may comprise an optional alert system 418 that receives the scalar output 416. In other implementations, the scalar output 416 may be passed directly to an output data interface 420 without post processing. In this latter case, the scalar output 416 may be packaged into a response to an original request to the input data interface 412. In both cases, output data 422 derived from the scalar output 416 is provided as an output of the machine learning system 402. The output data 422 is returned to allow final processing of the transaction data. For example, the output data 422 may be returned to the payment processor server 140 and used as the basis of a decision to approve or decline the transaction. Depending on implementation requirements, in one case, the alert system 418 may process the scalar output 416 to return a binary value indicating whether the transaction should be approved or declined (e.g., "1" equals decline). In certain cases, a decision may be made by applying a threshold to the scalar output 416. This threshold may be context dependent. In certain cases, the alert system 418 and/or the output data interface 420 may also receive additional inputs, such as explanation data (e.g., the "reason code" discussed above) and/or the original input data. The output data interface 420 may generate an output data package for output data 422 that combines these inputs with the scalar output 416 (e.g., at least for logging and/or later review). Similar, an alert generated by the alert system 418 may include and/or be additionally based on the aforementioned additional inputs, e.g. in addition to the scalar output 416.

In a preferred implementation, the machine learning system 402 is used in an "online" mode to process a high volume of transactions within a narrowly defined time range. For example, in normal processing conditions the machine learning system 402 may process requests within 7-12 ms and be able to manage 1000-2000 requests a second (these being median constraints from real-world operating conditions). However, the machine learning system 402 may also be used in an "offline" mode, e.g. by providing a selected historical transaction to the input data interface 412. In an offline mode, input data may be passed to the input data interfaces in batches (i.e., groups). The machine learning system 402 may also be able to implement machine learning models that provide a scalar output for an entity as well as, or instead of, a transaction. For example, the machine learning system 402 may receive a request associated with an identified user (e.g., a card or payment account holder) or an identified merchant and be arranged to provide a scalar output 416 indicating a likelihood that the user or merchant is fraudulent, malicious, or anomalous (i.e., a general threat or risk). For example, this may form part of a continuous or periodic monitoring process, or a one-off request (e.g., as part of an application for a service). The provision of a scalar output for a particular entity may be based on a set of transaction data up to and including a last approved transaction within a sequence of transaction data (e.g., transaction data for an entity similar to that should in FIG. 3A).

Example Transaction Process Flow

Figure 5A:
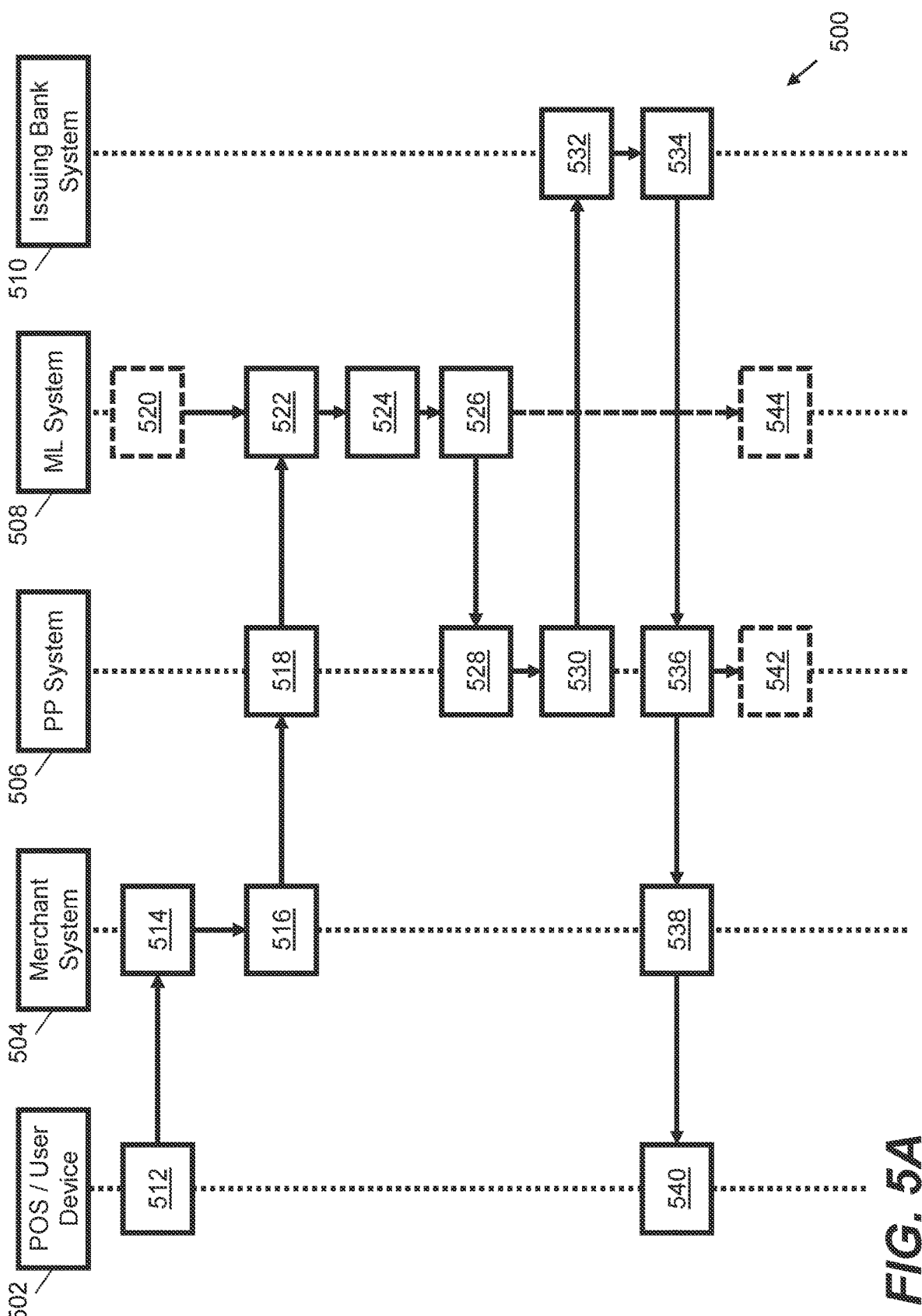
FIGS. 5A and 5B are sequence diagrams showing an example set of processes performed by different computing entities on transaction data.
Figure 5B:
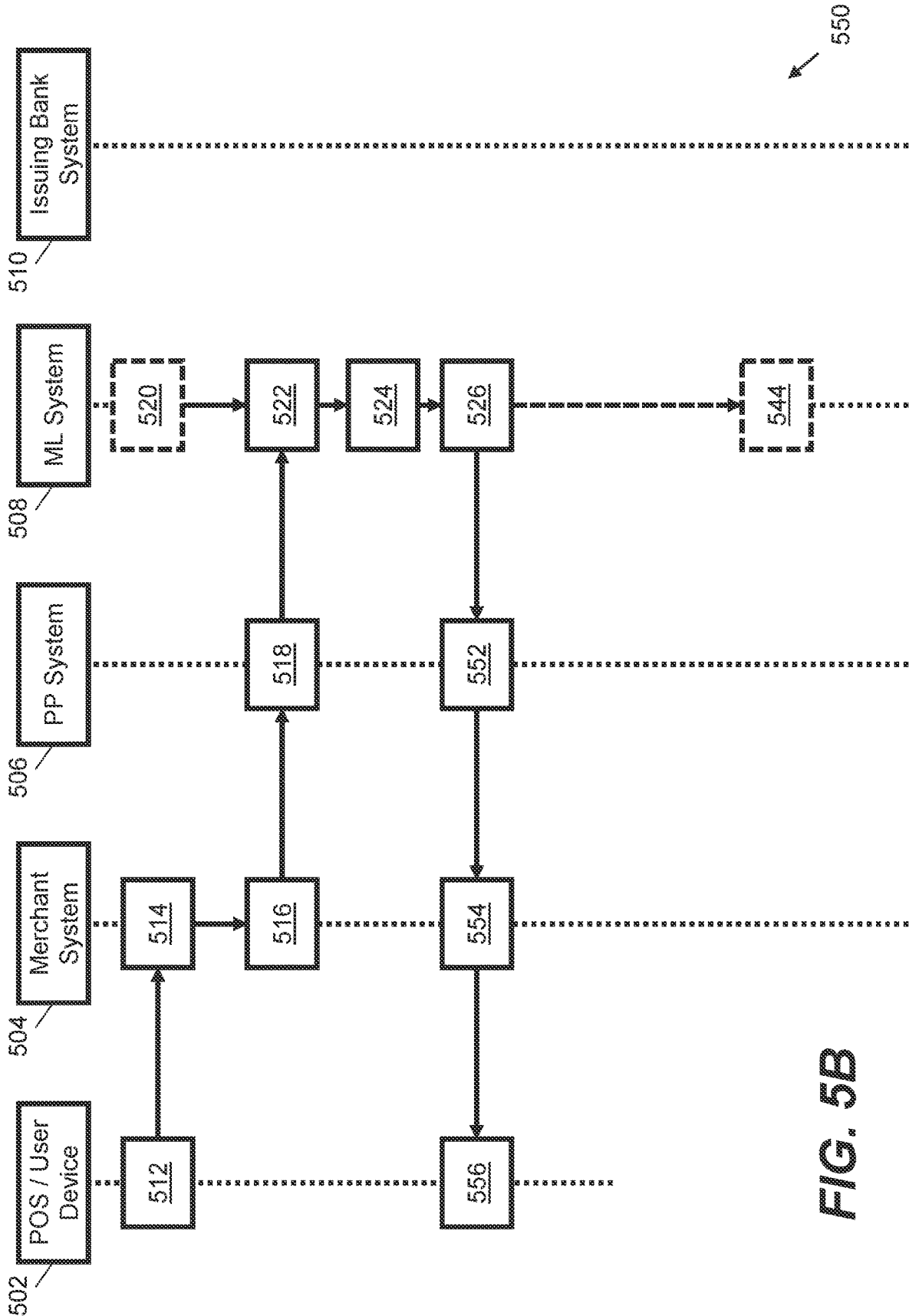

FIGS. 5A and 5B show two possible example transaction process flows 500 and 550. These process flows may take place in the context of the example transaction process systems 100, 102, 104 shown in FIGS. 1A to 1C as well as other systems. The process flows 500 and 550 are provided as one example of a context in which a machine learning transaction processing system may be applied, however not all transaction process flows will necessarily follow the processes shown in FIGS. 5A and 5B and process flows may change between implementations, systems and over time. The example transaction process flows 500 and 550 reflect two possible cases: a first case represented by transaction process flow 500 where a transaction is approved, and a second case represented by transaction process flow 550 where a transaction is declined. Each transaction process flow 500, 550 involves the same set of five interacting systems and devices: a POS or user device 502, a merchant system 504, a payment processor (PP) system 506, a machine learning (ML) system 508 and an issuing bank system 510. The POS or user device 502 may comprise one of the client devices 110, the merchant system 504 may comprise the merchant server 130, the payment processor system 506 may comprise the payment processor server 140, and the machine learning system 508 may comprise an implementation of the machine learning system 160, 210 and/or 402. The issuing bank system 510 may comprise one or more server devices implementing transaction functions on behalf of an issuing bank. The five interacting systems and devices 502 to 510 may be communicatively coupled by one or more internal or external communication channels, such as networks 120. In certain cases, certain ones of these systems may be combined, e.g. an issuing bank may also act as a payment processor and so systems 506 and 510 may be implemented with a common system. In other cases, a similar process flow may be performed specifically for a merchant (e.g., without involving a payment processor or issuing bank). In this case, the machine learning system 508 may communicate directly with the merchant system 504. In these variations, a general functional transaction process flow may remain similar to that described below.

The transaction process flow in both FIGS. 5A and 5B comprises a number of common (i.e., shared) processes 512 to 528. At block 512, the POS or user device 502 initiates a transaction. For a POS device, this may comprise a cashier using a front-end device to attempt to take an electronic payment; for a user device 502 this may comprise a user making an online purchase (e.g., clicking "complete" within an online basket) using a credit or debit card, or an online payment account. At block 514, the payment details are received as electronic data by the merchant system 504. At block 516, the transaction is processed by the merchant system 504 and a request is made to the payment processor system 506 to authorise the payment. At block 518, the payment processor system 506 receives the request from the merchant system 504. The request may be made over a proprietary communications channel or as a secure request over public networks (e.g., an HTTPS request over the Internet). The payment processor system 506 then makes a request to the machine learning system 508 for a score or probability for use in processing the transaction. Block 518 may additional comprise retrieving ancillary data to combine with the transaction data that is sent as part of the request to the machine learning system 508. In other cases, the machine learning system 508 may have access to data storage devices that store ancillary data (e.g., similar to the configurations of FIGS. 2A and 2B) and so retrieve this data as part of internal operations (e.g., based on identifiers provided within the transaction data and/or as defined as part of an implemented machine learning model).

Block 520 shows a model initialisation operation that occurs prior to any requests from the payment processor system 506. For example, the model initialisation operation may comprise loading a defined machine learning model and parameters that instantiate the defined machine learning model. At block 522, the machine learning system 508 receives the request from the payment processor system 506 (e.g., via a data input interface such as 412 in FIG. 4). At block 522, the machine learning system 508 may perform any defined pre-processing prior to application of the machine learning model initialised at block 520. For example, in the case that the transaction data still retains character data, such as a merchant identified by a character string or a character transaction description, this may be converted into suitable structured numeric data (e.g., by converting string categorical data to an identifier via a look-up operation or other mapping, and/or by mapping characters or groups of characters to vector embeddings). Then at block 524 the machine learning system 506 applies the instantiated machine learning model, supplying the model with input data derived from the received request. This may comprise applying the machine learning model platform 414 as described with reference to FIG. 4. At block 526, a scalar output is generated by the instantiated machine learning model. This may be processed to determine an "approve" or "decline" binary decision at the machine learning system 508 or, in a preferred case, is returned to the payment processor system 506 as a response to the request made at block 518.

At block 528, the output of the machine learning system 508 is received by the payment processor system 506 and is used to approve or decline the transaction. FIG. 5A shows a process where the transaction is approved based on the output of the machine learning system 508; FIG. 5B shows a process where the transaction is declined based on the output of the machine learning system 508. In FIG. 5A, at block 528, the transaction is approved. Then at block 530, a request is made to the issuing bank system 532. At block 534, the issuing bank system 532 approves or declines the request. For example, the issuing bank system 532 may approve the request if an end user or card holder has sufficient funds and approval to cover the transaction cost. In certain cases, the issuing bank system 532 may apply a second level of security; however, this may not be required if the issuing bank relies on the anomaly detection performed by the payment processor using the machine learning system 508. At block 536, the authorisation from the issuing bank system 510 is returned to the payment processor system 506, which in turn sends a response to the merchant system 504 at block 538, and the merchant system 504 in turn responds to the POS or user device 502 at block 540. If the issuing bank system 510 approves the transaction at block 534, then the transaction may be completed, and a positive response returned via the merchant system 504 to the POS or user device 502. The end user may experience this as an "authorised" message on screen of the POS or user device 502. The merchant system 504 may then complete the purchase (e.g., initiate internal processing to fulfil the purchase).

At a later point in time, one or more of the merchant system 504 and the machine learning system 508 may save data relating to the transaction, e.g. as part of transaction data 146, 240 or 300 in the previous examples. This is shown at dashed blocks 542 and 544. The transaction data may be saved along with one or more of the output of the machine learning system 508 (e.g., the scalar fraud or anomaly probability) and a final result of the transaction (e.g., whether it was approved or declined). The saved data may be stored for use as training data for the machine learning models implemented by the machine learning system 508. The saved data may also be accessed as part of future iterations of block 524, e.g. may form part of future ancillary data. In certain cases, a final result or outcome of the transaction may not be known at the time of the transaction. For example, a transaction may only be labelled as anomalous via later review by an analyst and/or automated system, or based on feedback from a user (e.g., when the user reports fraud or indicates that a payment card or account was compromised from a certain date). In these cases, ground truth labels for the purposes of training the machine learning system 508 may be collected over time following the transaction itself.

Turning now to the alternative process flow of FIG. 5B, in this case one or more of the machine learning system 508 and the payment processor system 506 declines the transaction based on the output of the machine learning system 508. For example, a transaction may be declined if the scalar output of the machine learning system 508 is above a retrieved threshold. At block 552, the payment processor system 506 issues a response to the merchant system 504, which is received at block 554. At block 554, the merchant system 504 undertakes steps to prevent the transaction from completing and returns an appropriate response to the POS or user device 502. This response is received at block 556 and an end user or customer may be informed that their payment has been declined, e.g. via a "Declined" message on screen. The end user or customer may be prompted to use a different payment method. Although not shown in FIG. 5B, in certain cases, the issuing bank system 510 may be informed that a transaction relating to a particular account holder has been declined. The issuing bank system 510 may be informed as part of the process shown in FIG. 5B or may be informed as part of a periodic (e.g., daily) update. Although, the transaction may not become part of transaction data 146, 240 or 300 (as it was not approved), it may still be logged by at least the machine learning system 508 as indicated by block 544. For example, as for FIG. 5A, the transaction data may be saved along with the output of the machine learning system 508 (e.g., the scalar fraud or anomaly probability) and a final result of the transaction (e.g., that it was declined).

Example Data Store Structure

As explained above, example machine learning systems described herein store data in, and retrieve data from, one or more data stores in one or more data storage devices. Examples that will now be described relate to how such data stores are created, maintained and used, and the structure and content of such data stores. Such examples address or at least ameliorate specific database-related problems in the context of machine learning systems, and in particular machine learning systems that facilitate real-time transaction processing. More specifically, examples that will now be described relate to a "layered state" data store configuration in which multiple different "layers" of state data (also referred to herein as "data") are stored in the data store(s). Each layer comprises one or more state data sets (also referred to herein as "data sets" or "states"), which store state data. Such layered state configuration may be used in various different types of state implementation, i.e. implementations in which state is to be stored and retrieved, for example for use by the example machine learning systems described herein. In examples, the data stored in the data store comprises historical transaction data and/or ancillary data such as described above. However, the techniques described herein may be applied to other types of data.

Layered state allows an "effective state" to be constructed dynamically using state data from several different state data sources, such as different state data sets, without having to modify individual state data one-by-one. In effect, layered state amalgamates state data from multiple different state data sets, rather than requiring the state data to be in a single state data set. This can be especially, but not exclusively, effective where large amounts of state data exist in distinct data sets and where combining the separate data sets into a single data set in a single procedure would involve significant amounts of resources, such as time. Such data sets may be separate for various reasons, for example to allow different machine learning models to be tested, to provide a data maturation environment, etc. However, the state data in those separate data sets may nevertheless be related and the example machine learning systems described herein may benefit from using state data from the separate data sets, as opposed to being constrained to using a single data set, for example in terms of providing more accurate results. Some example implementations described herein may be used for database-based state types. Other example implementations are described for data queues, where the data stored is ordered in time rather than being random-access as in a database. One such example implementation is on Apache Kafka (which may be referred to herein simply as "Kafka"). However, such example implementations may take other forms.

Layered state, as described herein, uses various concepts, including parents and overlays, which will now be described. In general terms, a parent data set of a child data set is a data set that is created before the child data set is created and to which the child data set is linked through parent metadata. In general terms, an overlay data set of a given data set is a data set that is applied to the given data set after the overlay data set and the given data set have been created and to which the given data set is linked through overlay metadata.

Figure 6A:
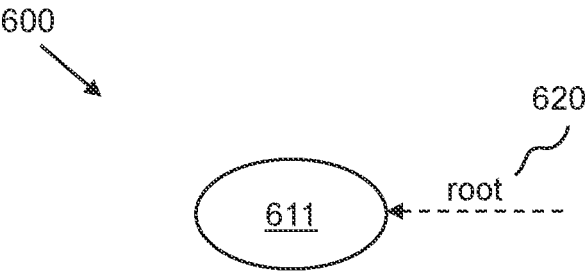
FIGS. 6A to 6E are state graphs representing example data stores.

FIG. 6A shows a state graph (which may be referred to herein simply as a "graph") 600 representing an example data store. The example data store comprises a first data set 611, which stores state data. The first data set 611 is identified using identification data in the form of a state id "state1". Although the example data store represented in the graph 600 includes only one data set, as will become apparent below, the state id is used in example state implementations to separate out different sets of state in the same collection, i.e. different data sets in the same data store. In this example, "state1" is the "current" state id, which may also be called the "root" or "live" state id. When writing into the data store, all data is written into a specified live data set. In this example, the first data set 611 is a root data set of the data store, as indicated by item 620. In this example, all data is read from the first data set 611 since this is the only data set in the example data store.

Figure 6B:
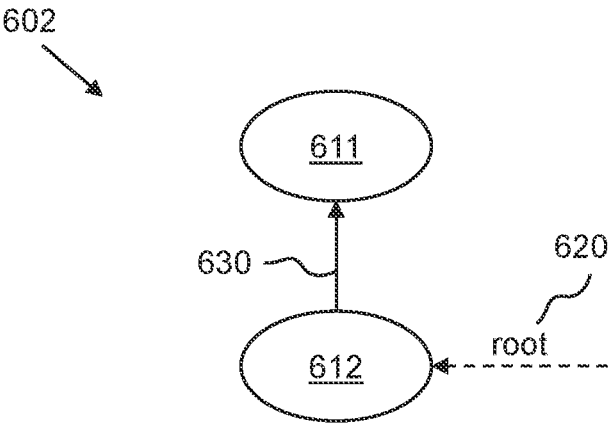

FIG. 6B shows another state graph 602 representing another example data store. The data store represented by the graph 602 may correspond to the data store represented by the graph 600, but at a later point in time. The example graph 602 demonstrates parent state. In this example, the data store comprises first and second data sets 611, 612, the first data set 611 being a parent data set (or simply "a parent") of the second data set 612, and the second data set 612 being a child data set (or simply "a child") of the first data set 611. As such, the parent and child data sets 611, 612 have a hierarchical relationship in the state graph 602, as indicated at 630. In this example, the parent and child data sets 611, 612 are identified using identification data in the form of state ids "state1" and "state2" respectively. As before, new data is written into the root (child) data set 612 having state id "state2". New data is not written into the parent data set 611 having state id "state1", but (historic) data may be read from the parent data set 611. In examples, a new data set having a new state id starts off as an empty data set. In this specific example, the child data set 612 would have been allocated a new state id ("state2"), and would have initially been empty, on its creation. As such, a new data set with a new state id will fill with (modified) data as new data gets written into the new data set. The parent link, indicated by item 630, comes into play when reading data from the data store. When performing a read operation, if a data item (which may also be referred to as a "key") being searched for is not found in the current data set, the data item is searched for in the parent data set. In examples, the parent link is via parent metadata stored in the data store. Although, in this example, metadata is stored in the data store, metadata is not necessarily stored in the same data store as state data. The metadata may be stored in a different type of data store from one in which state data is stored. For example, state data may be stored in a database and metadata may be stored in files, in an Apache Kafka queue, etc. Alternatively, metadata and state data may be stored in the same type of data store as each other.

Figure 6C:
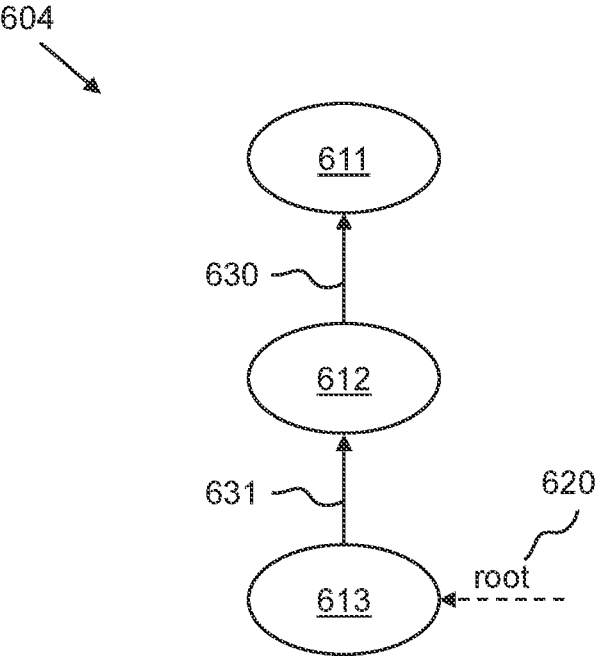

FIG. 6C shows another state graph 604 representing another example data store. The data store represented by the graph 604 may correspond to the data store represented by the graph 602, but at a later point in time. The example graph 604 demonstrates multi-parent state. In this example, the data store comprises a first data set 611, a second data set 612 which is a child of the first data set 611, and a third data set 613 which is a child of the second data set 612 (and hence a grandchild of the first data set 611). The first, second and third data sets 611, 612, 613 are therefore referred to as the grandparent, parent and child data sets 611, 612, 613 respectively. In this example, the grandparent, parent and child data sets 611, 612, 613 are identified using identification data in the form of state ids "state1", "state2" and "state3" respectively. In this example, the child data set 613 is a root of the data store, as indicated by item 620. Parent links 630, 631 exist between the grandparent and parent data sets 611, 612 and the parent and child data sets 612, 613 respectively. First parent metadata may define a link between the grandparent and parent data sets 611, 612 and second parent metadata may define a link between the parent and child data sets 612, 613. This is in contrast to metadata that would only define a link between the grandparent and child data sets 611, 613 which, as will be explained below, would not provide as comprehensive a search of the data set. When performing a read operation, if a data item being searched for is not found in the current data set (in this example the child data set 613), the parent data set 612 is searched for the data item and so on up the state graph to the grandparent data set 611. Effectively, this means that each data set, apart from the root, is a copy-on-write state snapshot at the point a new data set is branched off. The parent data set is no longer modified once a child data set is created from it, i.e. it becomes immutable when a child data set is created from it.

Figure 6D:
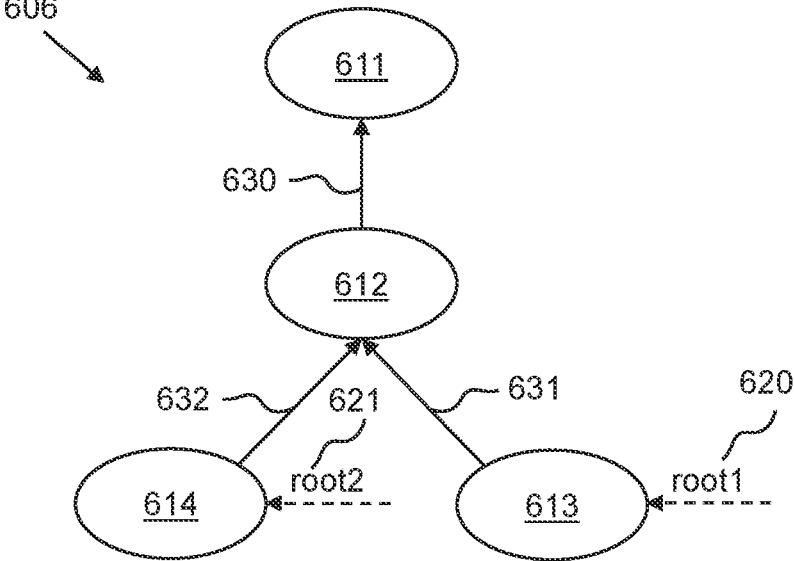

FIG. 6D shows another state graph 606 representing another example data store. The example graph 606 demonstrates multi-root state. In this example, the data store comprises a first data set 611, a second data set 612 which is a child of the first data set 611, a third data set 613 which is a child of the second data set 612 (and hence a grandchild of the first data set 611), and a fourth data set 614 which is also a child of the second data set 612 (and hence also a grandchild of the first data set 611). The first, second, third and fourth data sets 611, 612, 613, 614 are therefore referred to as the grandparent, parent, first child and second child data sets 611, 612, 613, 614 respectively. In this example, the grandparent, parent, first child and second child data sets 611, 612, 613, 614 are identified using identification data in the form of state ids "state1", "state2", "state3" and "state4" respectively. In this example, both child data sets 613, 614 are root data sets of the data store, as indicated by items 620, 621. As such, new data could be written to one or both of the child data sets 613, 614. Specifically, state id "state3" may be used to write data to the first child data set 613 and state id "state4" may be used to write data to the second child data set 614. Similarly, read access to the data store using state id "state3" would initially start at the first child data set 613, whereas read access to the data store using state id "state4" would initially start at the second child data set 614. Different clients may have, and use, different state ids, for example for data security purposes. Parent links 630, 631, 632 exist between the grandparent and parent data sets 611, 612, the parent and first child data sets 612, 613, and the parent and second child data sets 612, 614 respectively. As can be seen in this multi-root example, multiple child state ids, namely "state3" and "state4" can point at a single parent state id, namely "state2".

Figure 6E:
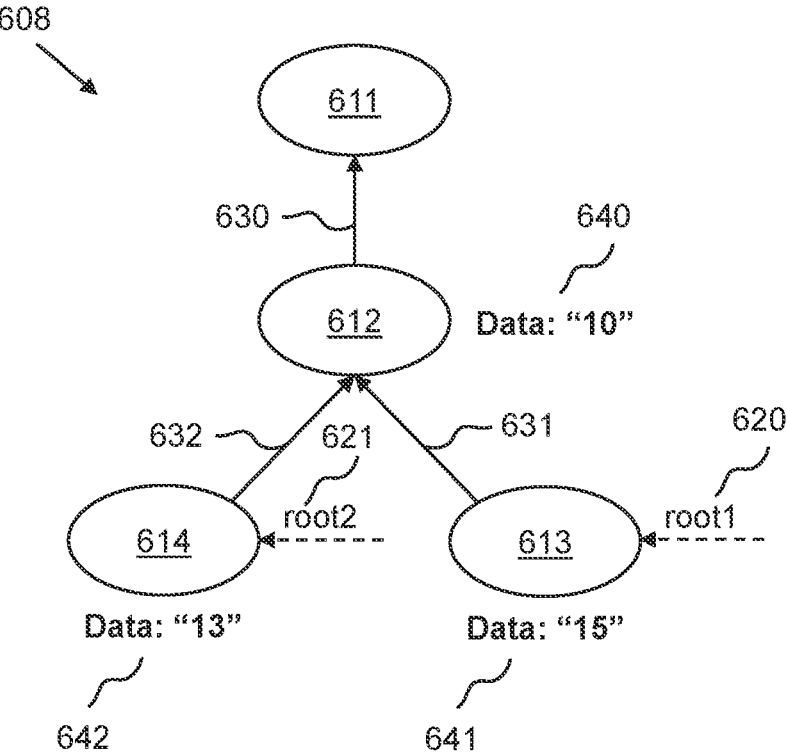

FIG. 6E shows another state graph 608 representing another example data store. The example graph 608 corresponds to the example graph 606 shown in FIG. 6D, but with example state data values shown to demonstrate state divergence. In this example, the parent data set 612 stores data 640 comprising a single data element having an example value of "10" stored against a given data item (not shown in FIG. 6E), the first child data set 613 stores data 641 comprising a single data element having an example value of "15" stored against the same given data item, and the second child data set 614 stores data 642 comprising a single data element having an example value of "13" again stored against the same given data item. The two child data sets 613, 614 both initially start off identical, as they are both empty on creation and both share the same parent data set 612. However, they then slowly diverge over time as different data 641, 642 is written into each root 620, 621 and, hence, to each child data set 613, 614.

When a data store is searched in accordance with examples, the search is looking for a data item, and data associated with the data item is returned. The data item can take different forms, for example depending on implementation details. However, in one possible form, the data item is a tuple based on a bankID (identifying a particular bank), an entity Type (indicative of a particular type of entity), and an entityId (identifying a particular entity).

Figure 7:
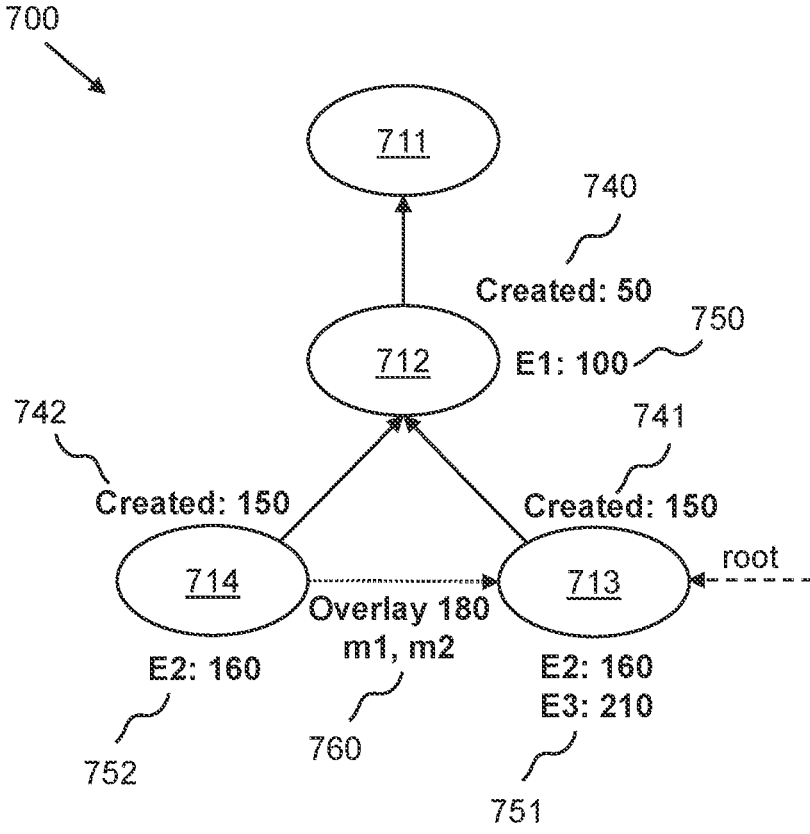
FIG. 7 is a state graph representing another example data store.

FIG. 7 shows another state graph 700 representing another example data store. The example graph 700 demonstrates an overlay and overlay state.

In this example, the state graph 700 comprises a grandparent state 711, and a parent data set 712 created at timestamp "50" (as indicated by timestamp data 740) and in which data was stored in association with a data item "E1" at timestamp "100" (as indicated by item 750). The state graph 700 also comprises first and second child data sets 713, 714 created at timestamp "150", as indicated by timestamp data 741, 742 respectively. Data was stored in the first and second child data sets 713, 714 association with a data item "E2" at timestamp "160", and data was stored in the first child data set 713 in association with a data item "E3" at timestamp "210", as indicated by items 751, 752. Unlike in FIG. 6E, values of the data stored are not depicted in FIG. 7. The values of the data stored in each of the first and second child data sets 713, 714 in association with the data item "E2" at timestamp "160" may be different from each other. In this example, the second child data set 714 became an overlay of the first child data set 713 at timestamp "180", as indicated by item 760. As explained above, a data element represents the whole or part of given data stored in the data store, and data may comprise one or more data elements in this respect. In this example, overlay data element selection metadata indicates that overlay data elements "m1" and "m2" from the second child data set 714 should be applied to the first child data set 713, as indicated by item 760. Overlay data elements "m1" and "m2" may relate to different machine learning models and may comprise different machine learning model data. The overlay data element selection metadata indicates specific data elements that are to be used from the second child data set 714 as an overlay data set. The second child data set 714 can include data elements that are not applied via the overlay. For example, the second child data set 714 could include an additional data element "m3" which is not being overlayed. This could be the case even if the first child data set 713 also comprises a corresponding "m3" data element. In examples, specific data elements from the overlay data set that improve machine learning system operation may be selected for application, whereas others that may not improve machine learning system operation may be inhibited from being applied.

As such, in accordance with examples, an overlay data set is used to update data in one data set with data in another data set, without actually copying any data from the one data set to the other data set. This is achieved, in examples, by modifying metadata for the overlay target data set (the data set to which the overlay data set has been applied) to indicate that data is, potentially, to be read from the overlay data set instead of from the data set to which the overlay data set has been applied. Data may be read in this manner between two given timestamps associated with the overlay data set. The timestamps may include a lower timestamp, corresponding to when the overlay data set was created (before it was overlayed). The timestamps include an upper timestamp, corresponding to when the overlay data set was overlayed.

In this example, every piece of data in a layered state type stores a timestamp. In examples, the timestamp is a strictly increasing integer representing when the data was updated. A timestamp may, however, take various different forms while still being indicative of an order in which updates occurred. The timestamp may be a last-modified timestamp indicating when the data was last-updated, but the timestamp does not necessarily indicate the most recent update in all examples.

When reading state data items from a given data set with an overlay data set applied, if the data read from the given data set was (last) modified between the time the overlay data set was created and when the overlay data set was applied to the given data set (also referred to as being "promoted"), the overlayed data is read from the overlay data set and applied on top of the data read from the given data set. As explained above, the overlayed data may be limited to specific overlay data elements, for example depending on the state type.

An example sequence of operations to produce the example state graph 700 will now be described. Initially, the first data set 711 having state id "state1" is created empty and with no parent. The second data set 712 having state id "state2" is created as a child of the first data set 711 at timestamp "50". The second data set 712 is empty on its creation and the first data set 711 becomes immutable on creation of the second data set 712. Data item "E" is written into the second data set 712 at timestamp "100", with the second data set 712 being the root state at timestamp "100". The third and fourth data sets 713, 714 having state ids "state3" and "state4" respectively are created as children of the second data set 712 at timestamp "150". The third and fourth data sets 713, 714 are empty on their creation and the second data set 712 becomes immutable on creation of the third and fourth data sets 713, 714. The data item "E2" is written into the third and fourth data sets 713, 714 at timestamp "160", with the third and fourth data sets 713, 714 both being roots at timestamp "160". At timestamp "180", the fourth data set 714 is overlayed onto the third data set 713, with overlay data elements "m1" and "m2" being selected for overlay application onto the third data set 713. The fourth data set 714 becomes immutable on becoming an overlay of the third data set 713. The data item "E3" is written into the third data set 713 at timestamp "210", with the third data set 713 being the only root data set (and, hence, not being immutable) at timestamp "210".

The example data store represented by the state graph 700 may store the following data:

{stateId: state2, key: E1, data: {[m1(E1)$_2$, m2(E1)$_2$, m3(E1)$_2$]}, timestamp: 100};
{stateId: state3, key: E2, data: {[m1(E2)$_3$, m2(E2)$_3$, m3(E2)$_3$]}, timestamp: 160};
{stateId: state4, key: E2, data: {[m1(E2)$_4$, m2(E2)$_4$, m3(E2)$_4$]}, timestamp: 160}; and
{stateId: state3, key: E3, data: {[m1(E3)$_3$, m2(E3)$_3$, m3(E3)$_3$]}, timestamp: 210}.

In such example data, "m1(Ej)$_k$" denotes a data element comprising one more values relating to an $i^{th}$ machine learning model, stored in association with key Ej, in the $k^{th}$ data set.

The example data store represented by the state graph 700 may store the following metadata:

{ stateId: state1, startTime: 0, endTime: 50 };
{ stateId: state2, startTime: 50, endTime: 150, parent: state1 };
{ stateId: state3, startTime: 150, parent: state2, overlay: { state4, [m1, m2], (150, 180) }
}; and
{ stateId: state4, startTime: 150, endTime: 180, parent: state2 }.

In this example, although the third data set 713 is a child of the second data set 712, it does not itself comprise the data item "E1" of the second data set 712. Also, even though the fourth data set 714 is an overlay of the third data set 713, the data associated with the data item "E2" in the fourth data set 714 has not actually been copied into the third data set 713.

Instead, the metadata links the second, third and fourth data sets 712, 713, 714 such that, as will be explained below, data can be read from the amalgam of these data sets without data having been copied from one such data set to another.

As such the metadata is separate from, and provides information about, data stored in the data store. In examples, the metadata provides information at the data set level, rather than at the data or data element level. In examples, the metadata is modifiable independently of the other data. Small changes to the metadata, which can be quick to make, can result in significant changes to the effective data that can be read from the data store, without significant amounts of data having to be copied.

In this example, the first data set 711 was a root between timestamps "0" and "50", the second data set 712 was a root between timestamps "50" and "150" and the fourth data set 714 was a root between timestamps "150" and "180". The third data set 713 became a root at timestamp "150" and is the current root.

Example (simplified) read logic for reading from the state graph 700 will now be described. Example write logic will also be described below. Although read and write operations may be described together herein, a read does not necessarily imply that a write will happen immediately. The same data item may be read multiple times before a write is performed into the root data set.

To read the "E1" data item, the current data set, namely the third data set 713, is searched (also referred to as "queried"). "E1" is not found in the third data set 713. The second data set 712 is identified via parent metadata and is queried as the parent data set of the third data set 713, and "E1" is found with a modify timestamp of "100". No overlays are applicable at this point, and so data associated with "E1" is returned. With reference to the above example, the returned data would be [m1(E1)$_2$, m2(E1)$_2$, m3(E1)$_2$]. The returned data may be written directly to the root data set, namely the third data set 713, in association with the data item "E1". When written back into the third data set 713, the data item "E1" has a timestamp greater than "180". Subsequent read requests for "E1" would retrieve the returned data from the third data set 713, as opposed to retrieving the data from the second data set 712 again.

To read the "E2" data item, the current data set, namely the third data set 713, is searched and "E2" is found with a modify timestamp of "160". The modify timestamp of "160", read from the third data set 713, is in the active overlay period for the fourth data set 714, namely from "150" to "180". As such, the fourth data set 714 is identified via overlay metadata and the data elements "m1(E2)$_4$" and "m2(E2)$_4$" are read from the fourth data set 714. In this example, data element "m3(E2)$_4$" is not read from the fourth data set 714 in view of the overlay data element selection metadata. In this example, "m1(E2)$_4$" and "m2(E2)$_4$" as read from the fourth data set 714 replace data elements "m1(E2)$_3$" and "m2(E2)$_3$" read from the third data set 713, but data element "m3(E2)$_3$" as read from the third data set 713 is not replaced by data from the fourth data set 714. The data associated with "E2" as modified, namely [m1(E2)$_4$, m2(E2)$_4$, m3(E2)$_3$] is returned. The "E2" data read from the fourth data set 714, namely "m1(E2)$_4$" and "m2(E2)$_4$", or modified such data, i.e. "m1(E2)$_{4\_mod}$" and "m2(E2)$_{4\_mod}$", is then written back directly to the root data set, namely the third data set 713, along with "m3(E2)$_3$" and with a modify timestamp greater than the overlay application timestamp of "180". The data read from the third data set 713 and/or the fourth data set 714 may be modified by the machine learning system before being written back to the root data set. In general, a write will be performed after data read from a data store has been modified by the machine learning system. As such, the data written to the root data set may be the data as read or a modified version of the data as read. When an overlay data set is applied to another data set, a new state id is not created, whether for the overlayed data set or to the data set to which the overlay data set is applied. Only the metadata of the existing root data set is modified to redirect reads to the overlay data set, where applicable. From that point, the overlay data set effectively becomes an irrevocable part of the content of the root data set.

To read the "E3" data item, the current data set, namely the third data set 713, is searched and "E3" is found with a modify timestamp of "210". No overlays are applicable at this point, as "E3" was written into the third data set 713 (at timestamp "210") after the fourth data set 714 was overlayed onto the third data set 713 (at timestamp "180"). "E3" in the third data set 713 should therefore already include any changes made to "E3" in the fourth data set 714 were they to exist. Data associated with "E3", namely [m1(E3)$_3$, m2(E3)$_3$, m3(E3)$_3$], is returned from the third data set 713 without modification.

Overlays can also be applied over changes to child states. The state read will take account of all the applicable overlays and will reconstruct the effective state as appropriate.

When searching for (also referred to as "reading") a data item, overlays that were added after the data item was last processed may still be checked for the data item. This would be where the overlay end time is greater than the data item (last-)modified timestamp, even if the overlay start time is after the data item (last-)modified timestamp. This is because the data item may be in the overlay but not in any of the main parent data sets, for example if the overlay changed how data items were resolved. That information can thereby still be included when returning the data item, even though the data item (last-)modified timestamp is outside the time range of the overlay.

In more detail, suppose a state store comprises a first data set, a second data set created as a child of the first data set at timestamp "150" and being the root data set, and a third data set also created as a child of the first data set at timestamp "150" but having become an overlay of the second data set at timestamp "180". Suppose also that the first data set includes an "E1" data item comprising a data element "m1" having a value "15", that the third data set includes an "E1" data item comprising a data element "m1" having a value "20", and that overlay data element selection metadata indicates that data elements "m1" and "m2" should be applied to the second data set. In this example, "E1" was written into the first data set some time before timestamp "150", and then "E1" was written only into the third data set between timestamps "150" and "180", i.e. "E1" was not also written to the second data set. When the reading logic finds "E1" in the first data set with, say, timestamp "75", it also searches the third data set (added as an overlay at timestamp "180") and applies that overlay to the data read from the first data set. This also applies when a data item only exists in an overlay, for example if "E1" had not been written to the first data set at all. When such a data item is not found in any parent data sets of the root data set, the data item has an effective read timestamp of "0" (or a different minimum possible timestamp value) when checking overlays.

Figure 8A:
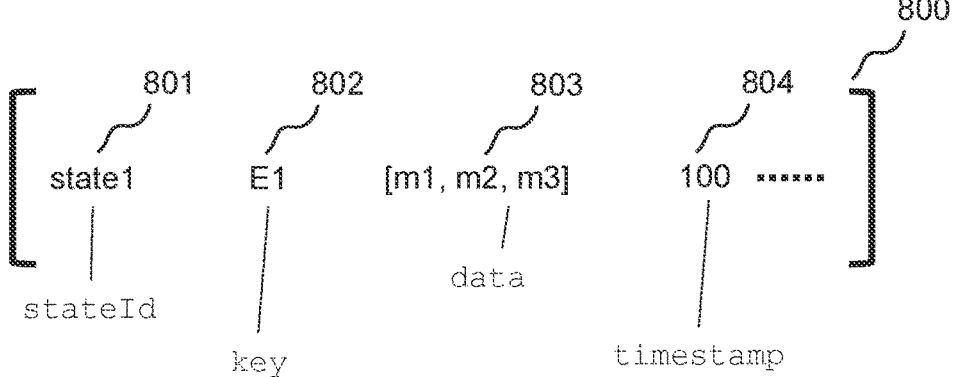
FIGS. 8A and 8B are schematic diagrams showing different examples of data and information stored in a data store.
Figure 8B:
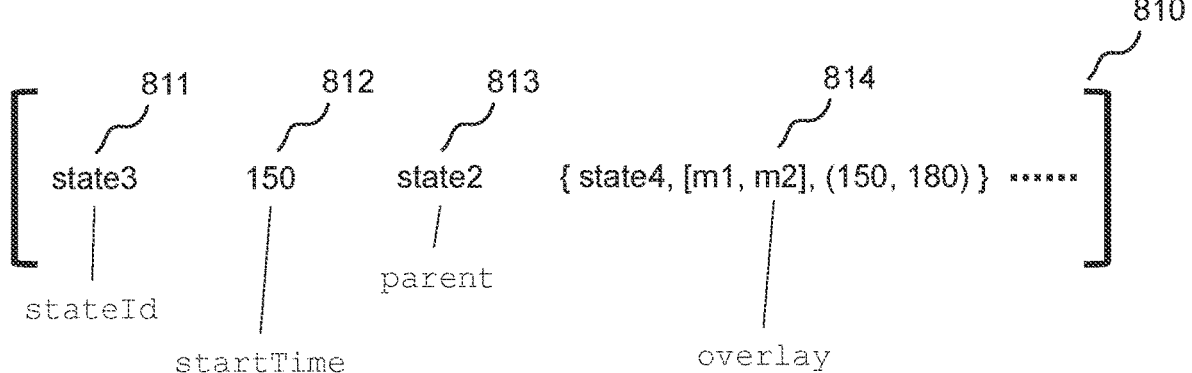

FIGS. 8A and 8B show how data and metadata may be stored in a data store in accordance with examples.

In this example, entity 800, which may be referred to as a "record", represents example information stored in a data store. In this example, entity 800 includes a stateId field 801 having a value "state1", indicating that the information depicted in entity 800 is associated with a data set having been allocated state id "state1". In this example, entity 800 also includes a data item field 802 having a value "E1", indicating that entity 800 stores data relating to data item "E1". In this example, entity 800 also includes a data field 803 having data elements [m1, m2, m3]. In this example, "m1", "m2", and "m3" each comprise one or more respective values associated with respective machine learning models. In this example, entity 800 also includes a timestamp field 804 having a value "100", indicating that the "E1" was updated at timestamp "100".

In this example, entity 810 represents example metadata. In this example, entity 810 includes a stateId field 811 having a value "state3", indicating that the metadata depicted in entity 810 is associated with a data set having been allocated state id "state3". In this example, entity 810 also includes a startTime field 812 having a value "150", indicating that the data set having state id "state3" was created at timestamp "150". In this example, entity 810 also includes a parent field 813 having a value "state2", indicating that the data set having state id "state2" is a parent of the data set having state id "state3". In this example, entity 810 also includes an overlay field 814 having a value "state 4, [m1, m2], (150, 180)", indicating (i) that the data set having state id "state4" is an overlay of the data set having state id "state3", (ii) that only data elements "m1" and "m2" should be applied from the overlay data set (having state id "state4"), and (iii) that the overlay data set (having state id "state4") has upper and lower timestamps of "150" and "180" respectively, with the upper timestamp of "180" being indicative of when the overlay data set (having state id "state4") became an overlay of the data set having state id "state3". Although not shown in FIG. 8B, entity 810 may, for example, include an endTime field indicating when a given data set became immutable and/or one or more additional overlay fields associated with one or more additional overlays of a given data set.

Figure 9:
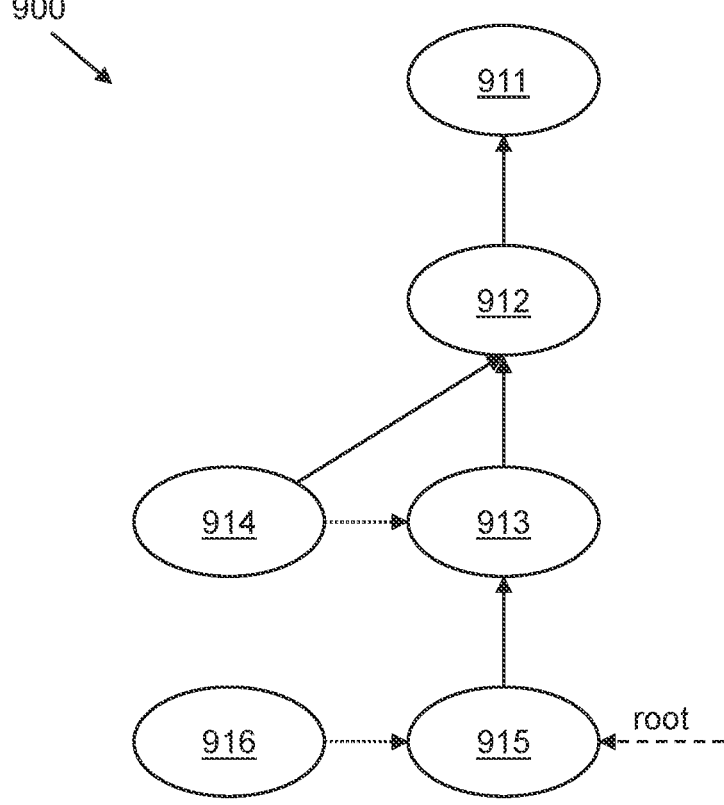
FIG. 9 is a state graph representing another example data store.

FIG. 9 shows another state graph 900 representing another example data set. The example graph 900 demonstrates unrelated state. In this example, the data store comprises a great-grandparent data set 911, a grandparent data set 912, a parent data set 913, a parent-overlay data set 914, a child data set 915 and a child-overlay data set 916. In this example, the data sets 911 to 916 are identified using identification data in the form of state ids "state1" to "state6" respectively. In this example, the parent-overlay data set 914 is a child of the grandparent data set 912 and is also an overlay of the parent data set 913. In this example, child-overlay data set 916 is an overlay of the child data set 915, but is not a child of the parent data set 913. Specifically, in this example, the parent data set 913 itself has an overlay data set in the form of the parent-overlay data set 914. In the configuration shown in FIG. 9, both the parent and parent-overlay data sets 913, 914 are nevertheless immutable.

Although an overlay often shares a parent data set with an overlay target data set (the data set to which the overlay is applied), that is not necessarily the case. An unrelated data set may be overlayed. In such examples, the overlay may use an overlay start time of "0". This feature can be used, for example, to insert new matured model data into an existing system without having to copy all the data from the new matured model into the existing system. In the example graph 900, the child-overlay data set 916 corresponds to (initially) unrelated state.

The relevance of parent state relationships to the definition of state can therefore be seen. State relationship metadata for a state id cannot be changed without drastically changing the data accessible in that state, as the effective data associated with that state is the result of an amalgam of state from parent data sets and overlays.

Figure 10:
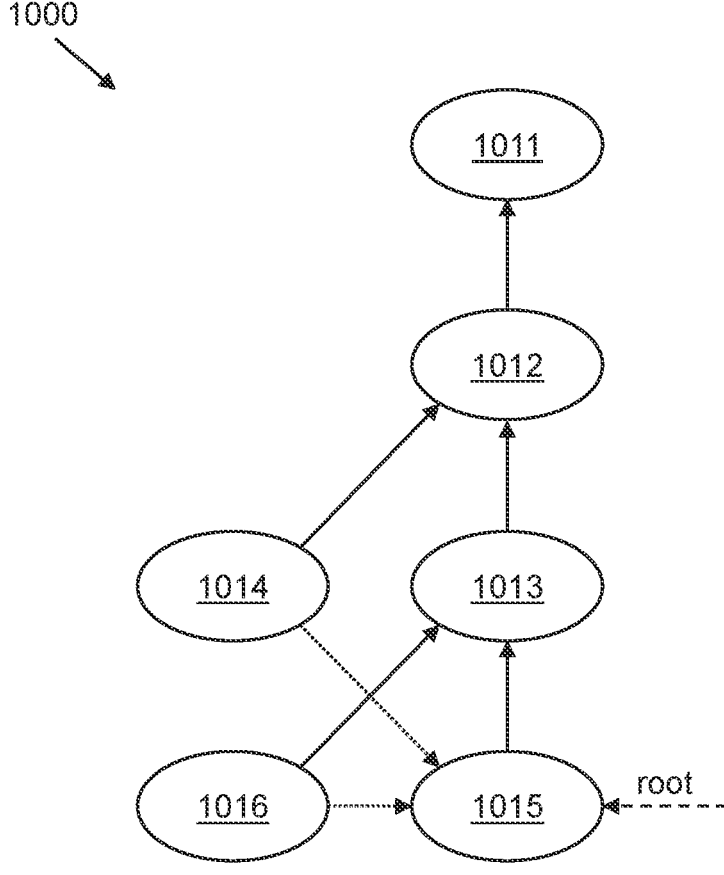
FIG. 10 is a state graph representing another example data store.

FIG. 10 shows another state graph 1000 representing another example data set. The example data set represented by the state graph 1000 is similar to the example data set represented by the state graph 900. However, instead of the fourth data set 1014 being an overlay of the third data set 1013, it is an overlay of the fifth data set 1015. As such, in this example, the fifth data set 1015 has two overlays, namely the fourth and sixth data sets 1014, 1016. Additionally, in this example the sixth data set 1016 is a child of the third data set 1013. By way of a specific example, suppose: (i) the fourth data set 1014 comprises a data item "E1" having data elements "m14" and "m24" and the fourth data set 1014 became an overlay of the fifth data set 1015 at a timestamp of "50", (ii) the sixth data set 1016 also comprises a data item "E1" having data elements "m16" and "m26" and the sixth data set 1016 became an overlay of the fifth data set 1015 at a later timestamp of "100", and (iii) the fifth data set 1015 also comprises a data item "E1" having data elements "m15" and "m25" with a modified timestamp of "75". Assuming further that all overlay data elements are to be read from the fourth and sixth data sets 1014, 1016, the read logic would: (i) initially find data item "E1" in the fifth data set 1015 with a modified timestamp of "75", (ii) identify the fourth data set 1014 as an overlay of the fifth data set 1015 based on overlay metadata but would not search for the data item "E1" in the fourth data set 1014 since the overlay timestamp of "50" for the fourth data set 1014 is earlier than the modified timestamp of "75", (iii) identify the sixth data set 1016 as an overlay of the fifth data set 1015 based on overlay metadata and would search for the data item "E1" in the sixth data set 1016 since the overlay timestamp of "100" for the sixth data set 1016 is later than the modified timestamp of "75", and (iv) return, for the data item "E1", the data elements "m16" and "m26" from the sixth data set 1016, instead of returning the data elements "m15" and "m25" from the fifth data set 1015. The data elements "m16 mod" and "m26 mod", namely "m16" and "m26" as modified, would be written into the fifth data set 1015 in association with the data item "E1". As explained above, such writing may not occur immediately after such reading.

In terms of performance, each read into a separate data set and overlay is a separate read operation to the data store. The parent and overlay logic is relatively complex and may be difficult to perform as a single query on the data store. As such, depending on how many data sets are involved, several read operations may be performed before given data is returned. However, all writes occur into the root data set. As such, the next time that data is read, it will be read directly from the root data set, as a single read. However, when a new data set is created (as an empty data set), all the reads will be from the parent with at least two read operations. In some implementations, the new data set may become populated with the most frequently modified data relatively quickly. Additionally, the number of read operations decreases over time and can tend towards the previous operation rate. Nevertheless, determining that a particular data item is not present in the effective data set (the amalgam of the applicable data sets in the graph) involves reading from all related data sets until the earliest data set has been read. This increases read operations whenever a new data set is created from the current root. To mitigate this, a clean-up operation can be configured to run to consolidate old data sets together to reduce the number of data sets in the hierarchy. This can cap the number of read operations required. The clean-up operation may be run periodically, or otherwise.

Figure 11:
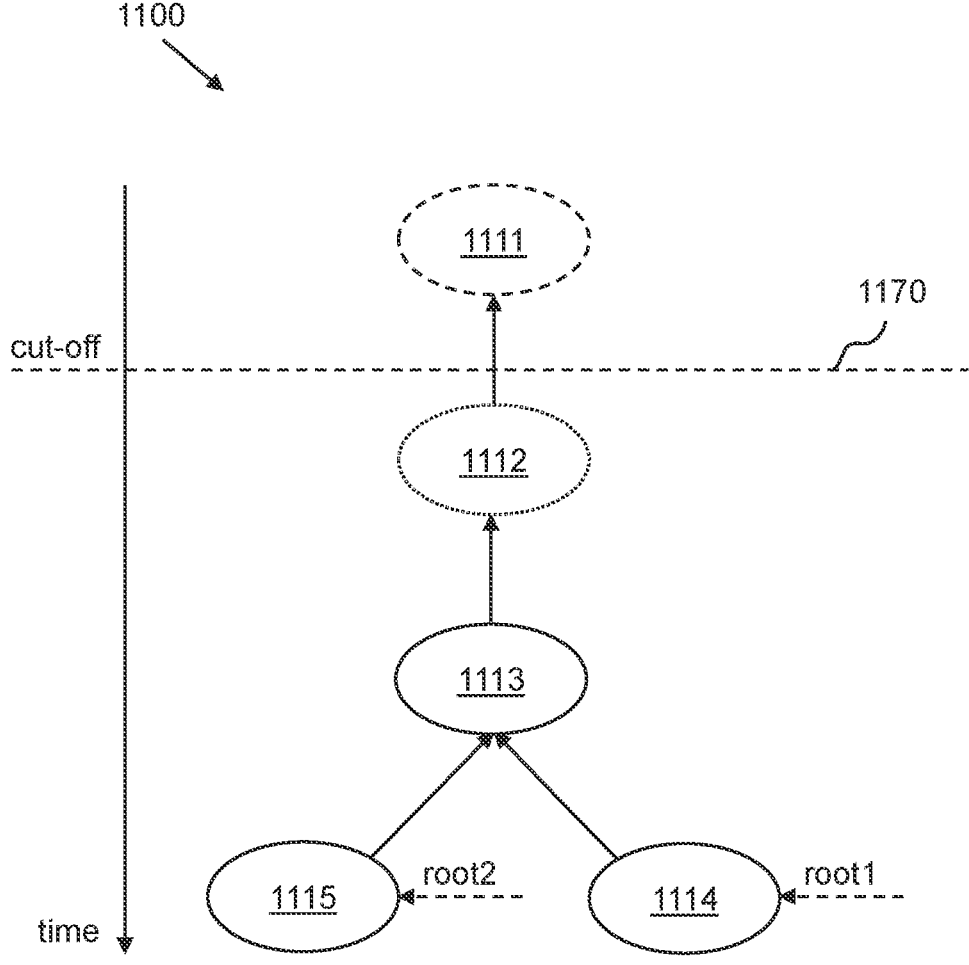
FIG. 11 is a state graph representing another example data store.

FIG. 11 shows another state graph 1100 representing an example data store. The example graph 1100 demonstrates eligible states.

The layered state clean-up operation addresses both a potential performance degradation and data store size, caused by an ever-growing number of layered states. As indicated, performance potentially degrades as more state layers are created and linked to one another. Finding a data item can take an increasing amount of time as an increasing number of parent data sets might need to be searched. This is especially true if a data item is not present in any of the data sets layers, as this forces the lookup to visit the entire data set history. The number of queries grows linearly with the number of data sets. This problem increases as data sets are promoted, creating more overlays. When a data item is not found in the main branch of the state tree, it could still be found in an overlay, so overlays are checked as well.

To manage such potential performance degradation, older data sets can be cleaned up as part of the layered state clean-up operation to reduce the number of queries to be performed when looking for a specific data item. This operation also saves space in the data store. In examples, unlayered data sets are not cleaned up. This does not appreciably affect performance where unlayered data sets are small. In terms of the layered state clean-up operation procedure, data set layers that are eligible for clean-up are collapsed into a single data set layer, referred to herein as the "target state", thus preventing extra reads. The target state is the lowest common ancestor of the data set layers pointed to by a root with a parent that has been locked (in other words that has become immutable) before a configurable cut-off. Data sets eligible for clean-up are: (i) the strict ancestors of the target data set, (ii) overlays of the strict ancestors of the target data set, and (iii) overlays of the target data set.

In the example graph 1100, the second data set 1112 is the lowest common ancestor of the data sets pointed to by a root data set (the fourth and fifth data sets 1114 and 1115) with a parent that has been locked before the cut-off 1170 (data set 1111). As such, data set 1112 is the target state. Necessarily, it is not eligible for clean-up itself. Data sets 1113, 1114 and 1115 are descendants of the target data set, data set 1112. Therefore, they are also not eligible for clean-up. Data set 1111 is a strict ancestor of the target data set, data set 1112. Therefore, data set 1111 is eligible for clean-up.

In this example, the clean-up procedure starts with identifying the target data set. The data sets eligible for clean-up are identified. All of the relevant data from the data sets eligible for clean-up is merged into the target data set. Overlays are applied when relevant so that no data is lost. The parent reference of the target data set is removed, making the target data set the new farthest ancestor of the data sets pointed to by roots. Also, any overlays applied onto the target data set are removed. The data sets eligible for clean-up are completely removed.

Figure 12A:
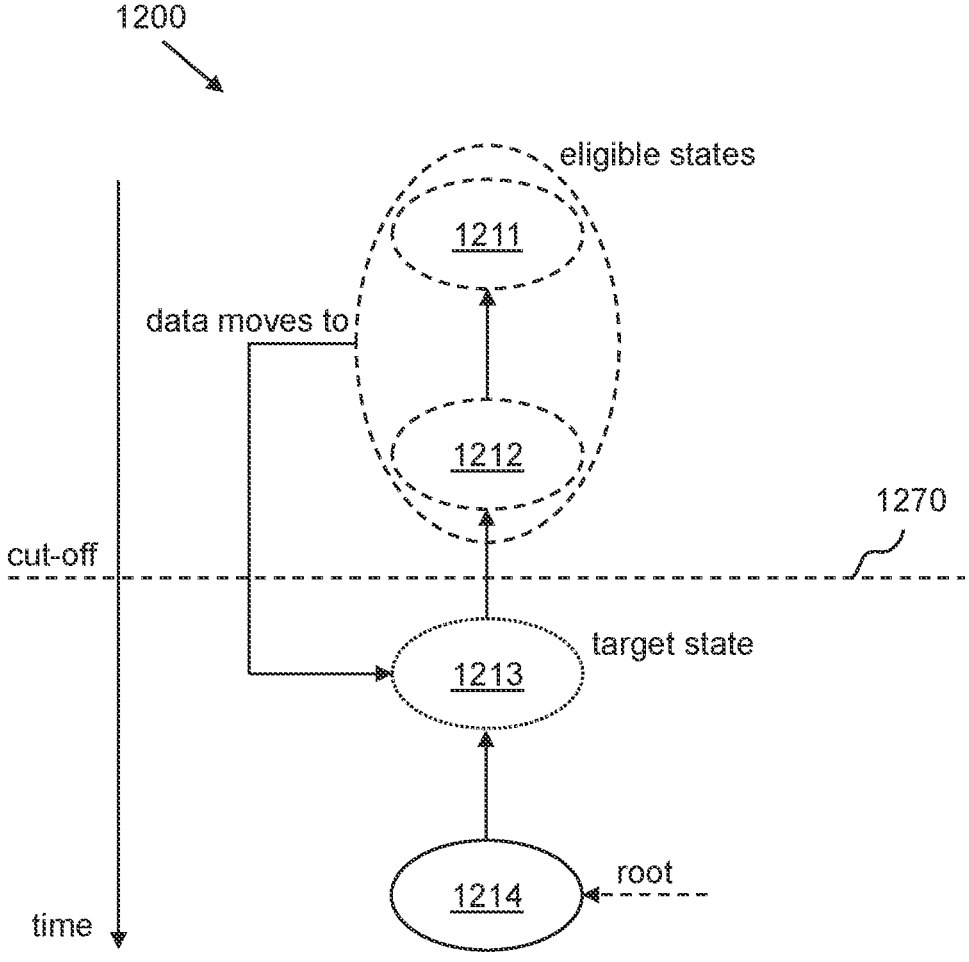
FIGS. 12A and 12B are state graphs representing other example data stores.

FIG. 12A shows another state graph 1200 representing another example data store. The example graph 1200 demonstrates layered state clean-up. The example graph 1200 represents the data store before clean-up is performed.

In this example, the data store comprises a great-grand-parent data set 1211, a grandparent data set 1212, a parent data set 1213, and a child data set 1214. In this example with four serial state layers, data sets 1211 and 1212 are the data sets eligible for clean-up. Data set 1213 is the target data set. The data of data sets 1211, 1212 and 1213 are merged and are written to data set 1213. The order in which the different steps are executed provides consistency of the data through-out the clean-up procedure. To merge data into the target data set, the effective data in the target is determined by reading the data from the target data set as a "virtual root". For each data item present in the data sets eligible for clean-up and the target data set, the data item is read from the virtual root as per the layered state reading logic described above. The resulting data is then written to the target data set. The target data set is not necessarily locked. In such cases, the target data set is also the live root data set. In this special case, the data the target data set contains is still subject to modifications. In such examples, the clean-up operation yields to concurrent writes. A concurrent write guarantees that the most up-to-date data is written to a target live root data set. In such instances, the merge step for that specific data item is made obsolete and is aborted. Because writes are atomic, there is no risk of getting corrupted data, which would result from a mix of the data written by the clean-up and an external source. In general, if a data item to be moved already exists in a target data set with a greater modified timestamp than that of the data item to be moved, then the data item in the target data set is not overwritten. This would still happen if the target data set is locked. More specifically, a write is made atomically, conditional on the data item not existing in the target data set already or a modified timestamp of a data item already in the target being less than or equal to a modified timestamp of the data being written to the target data set. A cut-off line is indicated by broken line 1270.

In examples, the timestamp written back to a consolidated data item is the maximum timestamp of the timestamps of all the data items merged into the consolidated data item. In examples, this is the case even if the latest data item is from an overlay data set that only has a subset of the final data in the consolidated data item.

Figure 12B:
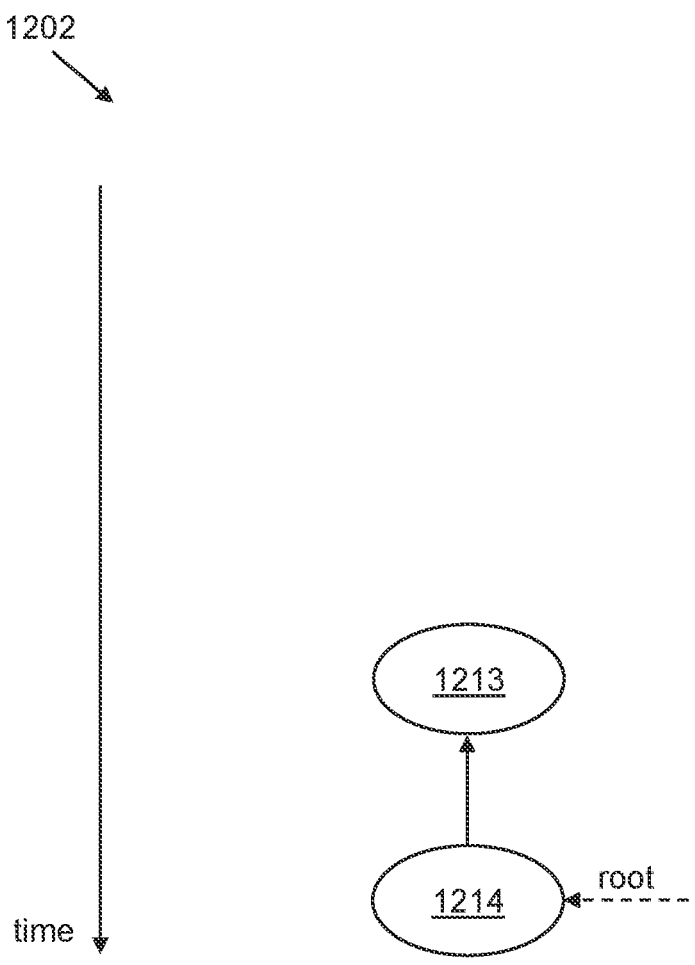

FIG. 12B shows another state graph 1202 representing another example data store. The example graph 1202 shown in FIG. 12B corresponds to the example graph 1200 shown in FIG. 12A after the clean-up operation has been per-formed.

Figure 13A:
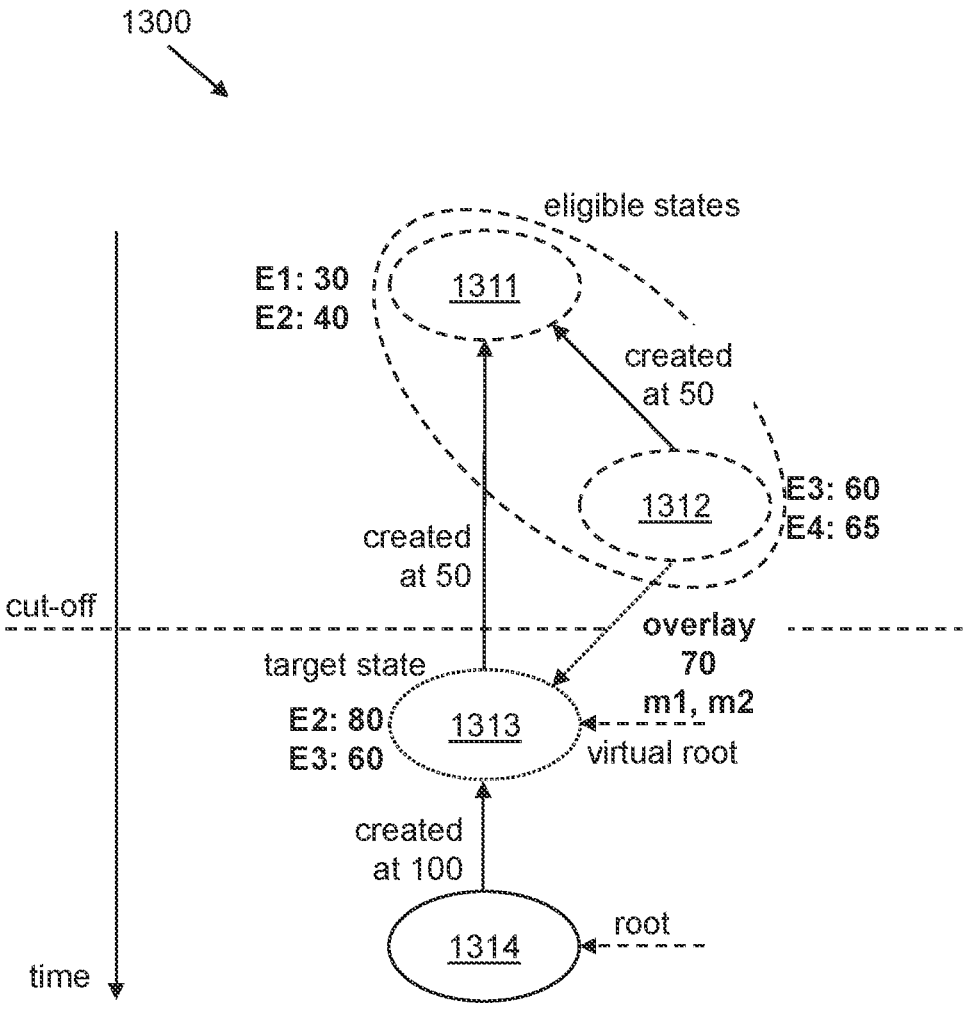
FIGS. 13A and 13B are state graphs representing other example data stores.

FIG. 13A shows another state graph 1300 representing another example data store. The example graph 1300 dem-onstrates layered state clean-up using a specific example.

An example sequence of operations to produce the state graph 1300 before the clean-up is as follows. The data set 1311 is created empty and with no parent state. The data item "E1" is written into the data set 1311 at timestamp "30". The data item "E2" is written into the data set 1311 at timestamp "40". The data sets 1312 and 1313 are created (empty) as children of the data set 1311 at timestamp "50" and the data set 1311 becomes immutable at timestamp "50". The data item "E3" is written into the data sets 1312 and 1313 at timestamp "60". The data item "E4" is written into the data set 1312 at timestamp "65". The data set 1312 is overlayed onto the data set 1313 at timestamp "70", with overlay data elements "m1" and "m2" selected. The now-overlayed data set 1312 becomes immutable at timestamp "70". The data item "E2" is written into the data set 1313 at timestamp "80". The data set 1314 is created (empty) as a child of the data set 1313 at timestamp "100". At timestamp "100", the data set 1313 becomes immutable.

In this example, the target data set is the data set 1313, and the data sets eligible for clean-up are the data sets 1311 and 1312. For each data item present in the data sets 1311, 1312 and 1313, the effective data is read from a virtual root pointing to the data set 1313, and is then written to the data set 1313. The overlay data set 1312 is valid for data saved at timestamps up to "70".

The simplified clean-up logic is as follows. For merging "E1", "E1" is not found in the data set 1313. "E1" is found in the data set 1311, with no data found in the applicable overlay data set 1312. "E1" as found in the data set 1311 is copied into the data set 1313. For merging "E2", "E2" is found in the data set 1313. "E2" as found in the data set 1313 is not modified because it is already in the data set 1313 with no applicable overlays. For merging "E3", "E3" is found in the data set 1313. However, the data found in the data set 1313 is updated with data relating to the overlay data elements "m1" and "m2" found in the applicable overlay data set 1312. The effective data is written to the data set 1313. For merging "E4", "E4" is not found in the data set 1313. "E4" is also not found in the data set 1311. "E4" is found in the data set 1312. The effective data only contains the data relating to "m1" and "m2". The effective data is written to the data set 1313. Once the data items have been merged to the data set 1313, the data sets 1311 and 1312 are deleted.

Figure 13B:
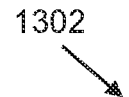
Figure 13B:
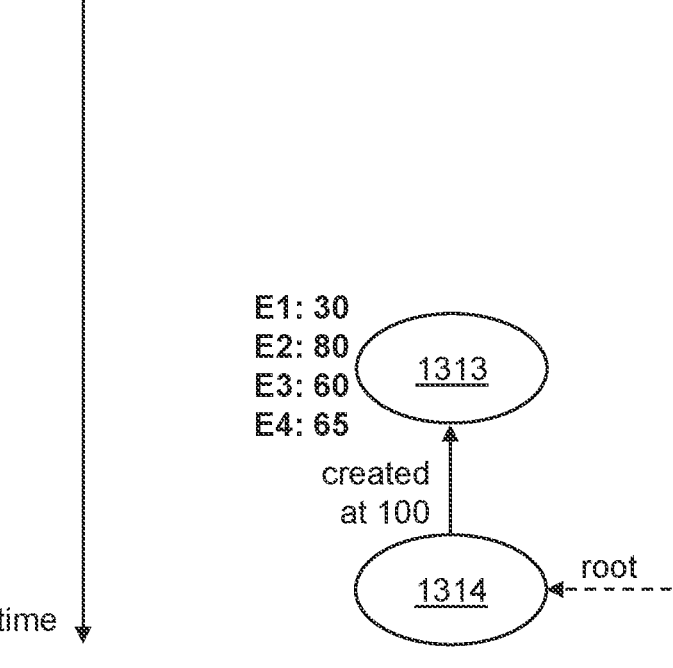

FIG. 13B shows another state graph 1302 representing another example data store. The example graph 1302 shown in FIG. 13B corresponds to the example graph 1300 shown in FIG. 13A after the clean-up operation has been per-formed. In effect, the "E1" data in the data set 1311 has been moved in its entirety to the data set 1313. The "E2" data in the data set 1313 is unmodified. The "E3" data in the data set 1313 has been updated with the data found in the data set 1312 relating to "m1" and "m2". The "E4" data in the data set 1312 relating to "m1" and "m2" has been moved to the data set 1313.

The frequency at which the layered state clean-up opera-tion runs may be set, for example by an operator. The length of history of state snapshots to keep before cleaning them up may also be set, for example by an operator.

While data is being merged, which can be a relatively long time (e.g. several hours), additional changes may still be made to the data store, as long as any modifications occur after the cut-off for the active clean-up operation. In examples, the layered state clean-up operation always yields to concurrent writes, as they are necessarily providing the most up-to-date data.

In some examples, a source of the timestamps described herein may be reset. Examples provide timestamp era tech-niques in this regard in which a timestamp comprises multiple parts. One of the parts may be incremented while the other part remains constant. In response to a trigger, for example the timestamp source resetting, the part that was constant can be incremented and the part that was being incremented can be reset. For example, the multi-part time-stamp may initially increment as (0,0), (0,1), (0,2) and (0,3) and, in response to the trigger, may increment as (1,0), (1,1), (1,2) etc. In response to a further trigger, the timestamp may increment as (2,0), (2,1), (2,2) etc.

As explained above, data storage and/or a data store may be partitioned into multiple different partitions, for example for security reasons. Different partitions may be identified based on different partitionIds. Timestamps may be partition-based in that they increment at a partition level, rather than at an overall system level. In examples, an entity or data item hashes deterministically into a specific partition, such that timestamps are strictly incrementing for that entity or data item.

In relation to data deletion, data may be deleted from a layered state. If the data only exists in the current root, then the data could simply be removed from the data store. However, if the data exists in a parent state and/or an overlay state, the data cannot be removed directly. This is because all states apart from the root(s) are immutable. Instead, a marker is inserted into the current root state indicating the data to be regarded as deleted and when such deletion occurred. Then, when subsequent reads find the deletion marker, they stop reading at that point and return no data. However, the old data, which should be regarded as deleted, still exists in the parent and/or overlay states. As such, if a new root is created from a snapshot state, the data that is to be regarded as deleted will still be present in the snapshot state. The deletion marker additionally acts as an indicator not to insert another marker in future roots should the data item in question be deleted again, provided it is the latest. In examples, the deletion marker is only not inserted if the data item in question only exists in overlays for non-promoted data elements, e.g. models. An overlay can, in effect, undo a deletion made in relation to another data set by overlaying data (from the overlay) over data where the deletion marker was in the other data set.

When cleaning up data items with a deletion marker, a deletion marker effectively makes the clean-up operation ignore all state for that data item before that point. Suppose, in a first example, a data store includes, for a clean-up operation, a target data set, a parent data set of the target data set and a grandparent data set of the target data set. Suppose also that the parent data set comprises a data item "E1" with a deletion marker and that the grandparent data set also comprises data item "E1" but with a data element "m1" having a value "30" (which may be denoted "E1: {m1: 30}"). After clean-up, the target data set would not have any data for "E1" at all in view of the deletion marker, and the parent and grandparent data sets would be removed from the data store, including any deletion markers in them. Suppose, in a second example, that the data store of the first example included an additional data set between the parent data set and the target data set and that the additional data set also comprised data item "E1" but with data element "m1" having a value "10" (which may be denoted "E1: {m1: 10}"). In the second example, the clean-up operation would put "E1: {m1: 10}" in the target data set, copied from the additional data set, then additional, parent and grandparent data sets would be removed from the data store.

It is also possible for an overlay to undo a deletion marker. For example, suppose that a data store comprises a parent data set with a data item "E1" having data element "m1" with a value "15" and "m2" with a value "20", and an updated timestamp of "75" (which may be denoted "E1: {m1: 15, m2: 20}, timestamp 75"). Suppose also that a first child data set of the parent data set was created at timestamp "150", is the root of the data store, and comprises a data item "E1" having a deletion marker and an updated timestamp of "160" (which may be denoted "E1: delete, timestamp 160"). Suppose further that a second child data set of the parent data set was created at timestamp "150" and comprises a data item "E1" having a data element "m1" with a value "20", a data element "m2" with a value "25", and an updated timestamp of "170" (which may be denoted "E1: {m1: 20, m2: 25}, timestamp 170"). Suppose additionally that second child data set became an overlay of the first child data set at timestamp "180" with overlay data element selection metadata indicating that only data element "m1" is to be applied to the first child data set. In such an example, the read logic will find the deletion marker for "E1" in the first child data set, and will stop searching ancestors of the first child data set in response. The read logic will then check overlays, identify the overlay from the second child data set covering "150" to "180", and will read "m1" from the second child data set. As such, the returned data will be "E1: {m1: 20}". The same logic may be used in clean-up operations as described herein. Such logic would also apply if the deletion marker were in the second child data set rather than the first child data set, removing the overlayed data elements from the data item before returning them. If the deletion marker were in the first data set in connection with "E1", and if the second child set were applied as an overlay with no data for "E1" at all over the applicable time period, then the deletion for "E1" may, in effect, be undone, with the reading logic reading whatever (if anything) is in "E1" in any ancestors of the first child data set. However, in other examples, the deletion marker would continue to be used.

Figure 14:
FIG. 14 is a state graph representing another example data store.
Figure 14:
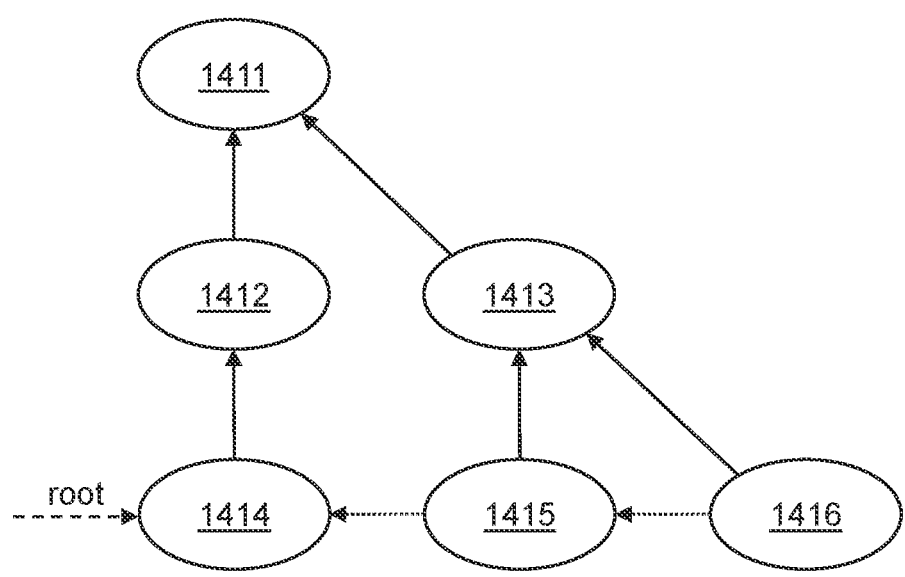

FIG. 14 shows another example of a state graph 1400 representing a data store. The example graph 1400 demonstrates recursive overlays. In this example, a first data set 1411 is a grandparent data set. Second and third data sets 1412, 1413 are both children data sets of the grandparent data set. A fourth data set 1414 is a child of the second data set 1412, with the second data set therefore being a parent of the fourth data set 1413. The third data set 1413 has two child data sets, namely fifth and sixth data sets 1415, 1416. The fifth data set 1415 is an overlay of the fourth data set 1414. The sixth data set 1416 is an overlay of the fifth data set 1415. In this example, the fifth data set 1415 (*i*) is an overlay of the fourth data set 1414, (ii) has the third data set 1413 as a parent data set, (iii) has the first data set 1411 as a grandparent data set, and (iv) has the sixth data set 1416 as an overlay even though the fifth data set 1415 is itself an overlay. If the fifth data set 1415 is searched for a data item, the third data set 1413, the first data set 1411 and/or the sixth data set 1416 may be searched in a similar manner to how searching is performed in respect of the fourth data set 1413.

Figure 15:
FIG. 15 is a state graph representing another example data store.
Figure 15:
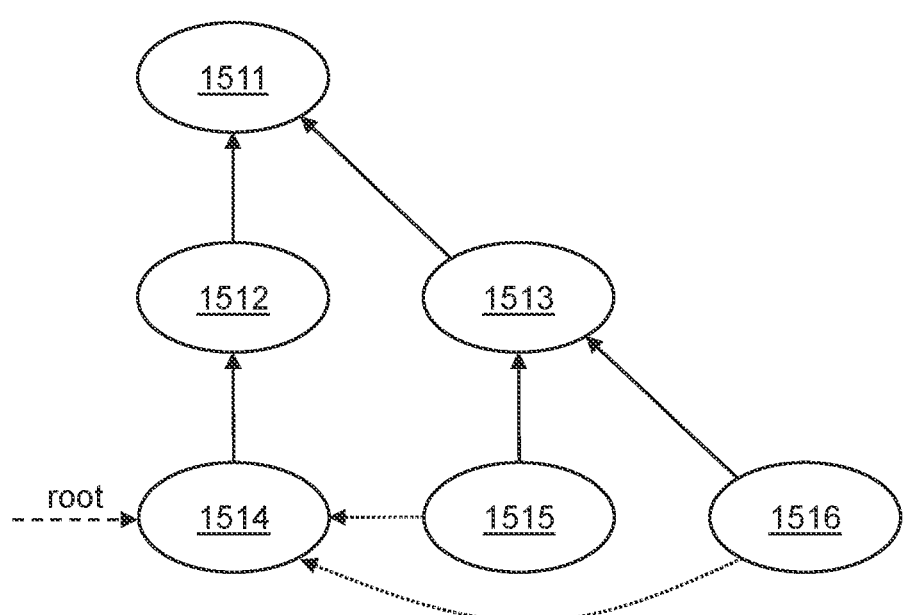

FIG. 15 shows another example of a state graph 1500 representing a data store. The example data store represented by the state graph 1500 corresponds to the example data store represented by the state graph 1400, except that, in the former, the sixth data set 1516 is an overlay of the fourth data set 1514 and is not an overlay of the fifth data set 1515. As such, the fourth data set 1514 has two overlays; the fifth and sixth data sets 1515, 1516.

Examples described above relate to data stores in the form of databases. Examples will now be described which relate to data queues. In examples, such data queues store feature vectors by machine learning models. However, such data queues may store other data to be output by machine learning models.

As part of the processing of events, models can output data onto one or more model-specific data queues that can then be read. As part of defining a queue, the model also defines the minimum duration data should be kept in the queue for. In a live system, the data queues may be stored in a persisted message queue. In this specific example, the data queues are stored in Apache Kafka. However, data may be stored in another manner in other examples. More specifically, there are other ways to implement state layers, for example using message queues. The data retention period maps onto the queue retention period for the Apache Kafka topic storing the data. Topics are created as necessary by a controller when a model is uploaded into the engine. However, they are not deleted when a model is deleted. This is because the model may be recreated soon after and would expect the data to still be there. If a model is deleted permanently, then all the data in the topics will time out over time, leaving empty topics in Apache Kafka taking up minimal disk space. In terms of layered queue state, the data queues follow the state layering principles described above. This is achieved on Apache Kafka by maintaining separate topics for each active queue in each state, and stitching the queues together into one logical queue to read the full contents. With reference, specifically, to Apache Kafka, data cannot be deleted from Apache Kafka queues, so there is no data clean-up operation to be run as such. Instead, queues are removed once they have timed out. A separate operation may be provided to remove any unused empty queues, and generally to remove any unused and unlinked states from a data store or metadata.

Figure 16A:
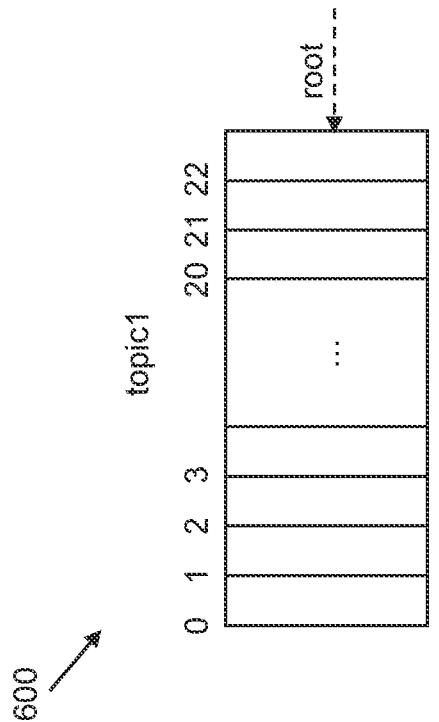
FIGS. 16A to 16E are graphs representing example data queues.

FIG. 16A shows an example queue 1600 in a single state, represented as a single Apache Kafka topic: "queue1-state1: [topic1: 0]".

Figure 16B:
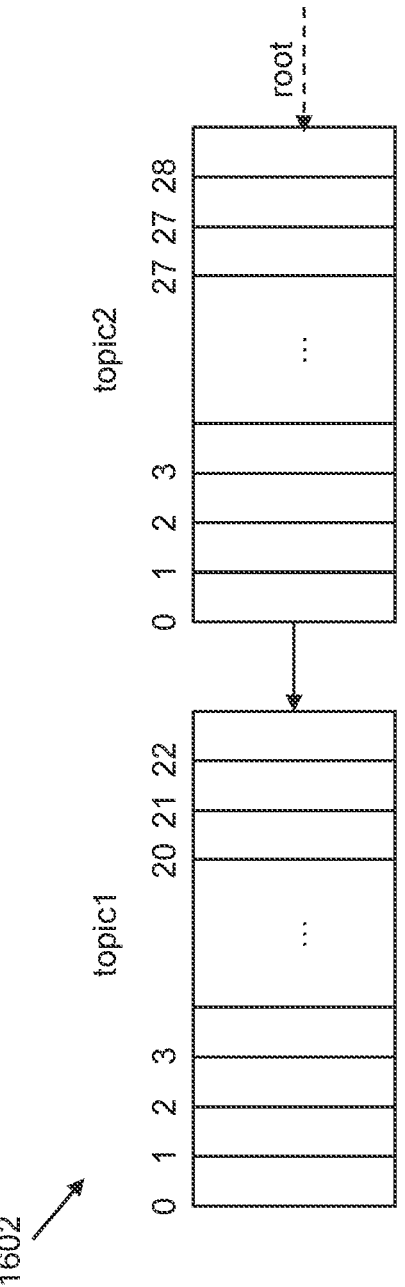

FIG. 16B shows an example queue 1602 in which, when a child state is created, a new topic is created for that state, and metadata for the queue as a whole is updated to link the queues together. New messages are put onto the end of the most recent topic: "queue1-state2: [topic1: 0, topic2: 23]". As part of the queue metadata, each topic has an "offset" specifying the offset of the topic contents in the overall queue. This offset is added to the offset of the message within each topic to get the message offset within the queue as a whole.

Figure 16C:
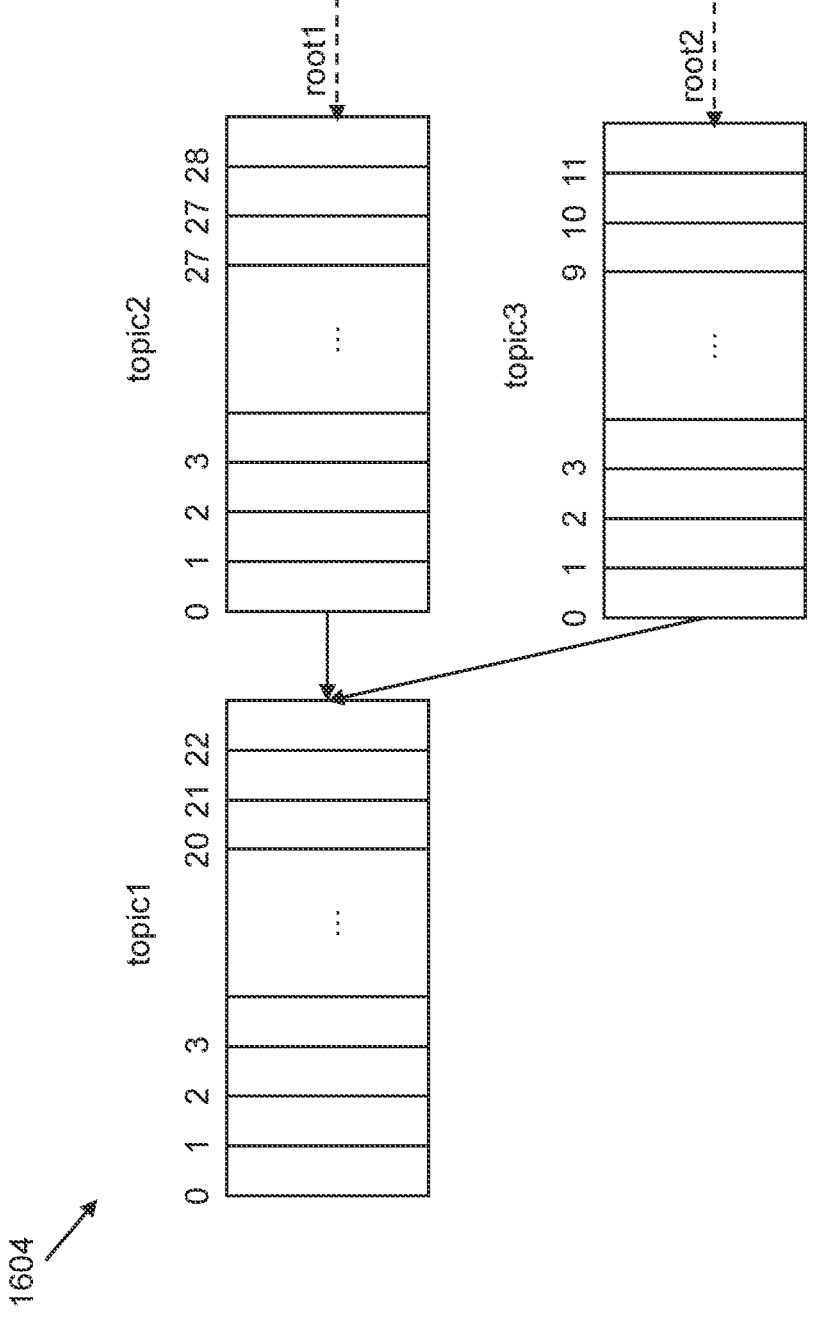

FIG. 16C shows another example queue 1604. Similar to layered state, there can be multiple child topics based on the same parent topic: "queue1-state2: [topic1: 0, topic2: 23]" and "queue1-state3: [topic1: 0, topic3: 23]".

Figure 16D:
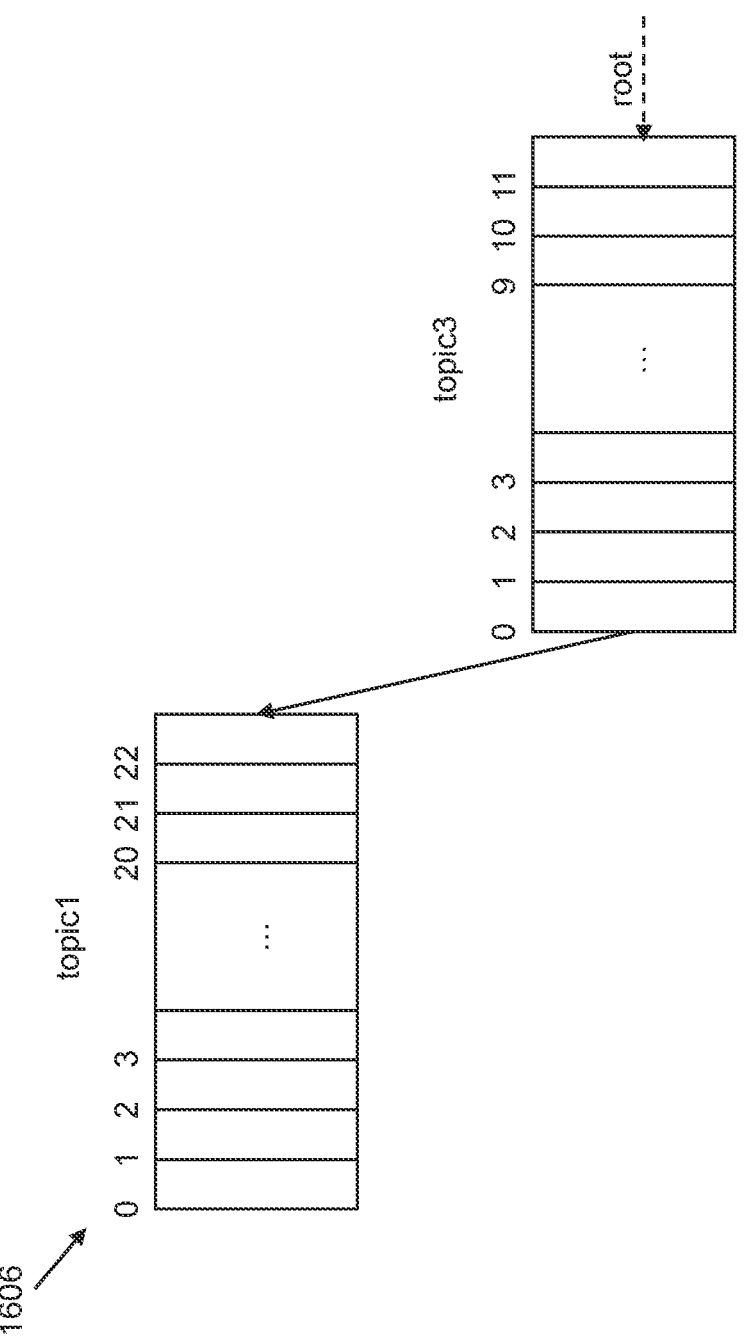

FIG. 16D shows another example queue 1606. When a state gets overlayed, the root pointer changes to point to the overlayed topic directly, and the obsolete topic is deleted: "queue1-state2: [topic1: 0, topic3: 23]".

Figure 16E:
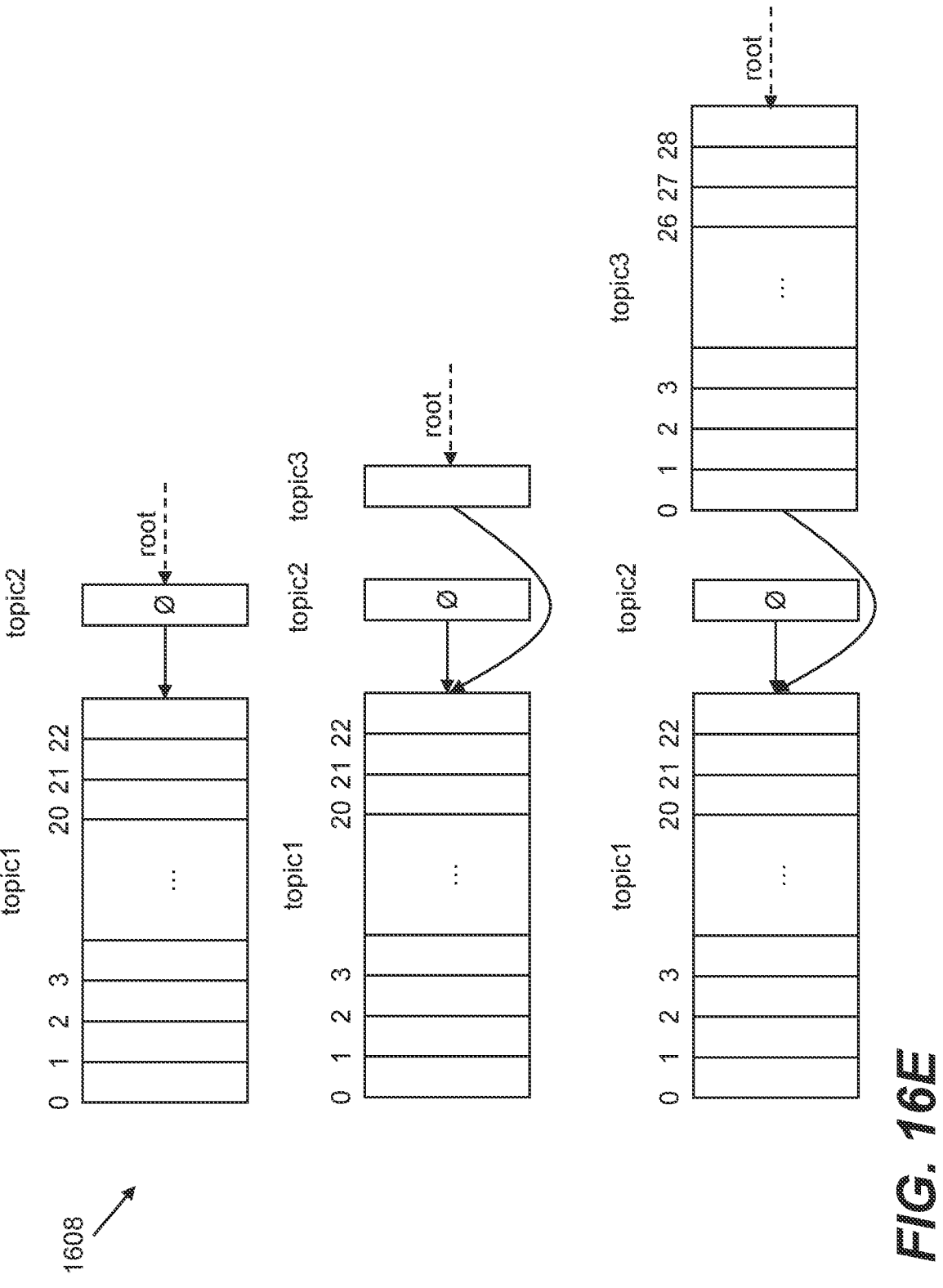

FIG. 16E shows another example queue 1608. There are special cases in all of these state operations so that, when the current topic is empty, the "parent" link of the new topic points directly at the parent of the current topic, bypassing the empty topic entirely. For example: "queue1-state3: [topic1: 0, topic3: 23]". This is to ensure there are no topics in the middle of a queue which have no data in them.

Data in a data queue has a different state implementation from other state types. As such, the clean-up operation operates differently on this state type. Owing to the guarantee on data retention the engine provides to model queues, and the way data is stored (Apache Kafka rather than a database), the state is only cleaned up when a model queue is found to be empty. When that is the case, the metadata corresponding to the model queue made obsolete can be deleted, as well as the corresponding topic itself. Message queues become empty when all the messages they contain eventually time out. In a specific example, a model data queue is eligible for clean-up if it fulfils the following conditions: (i) all of its ancestors are empty, itself included, (ii) it is an ancestor of a queue pointed to by a root, and (ii) it is not directly pointed to by a root. Other conditions may, however, be used in other examples.

Figure 17A:
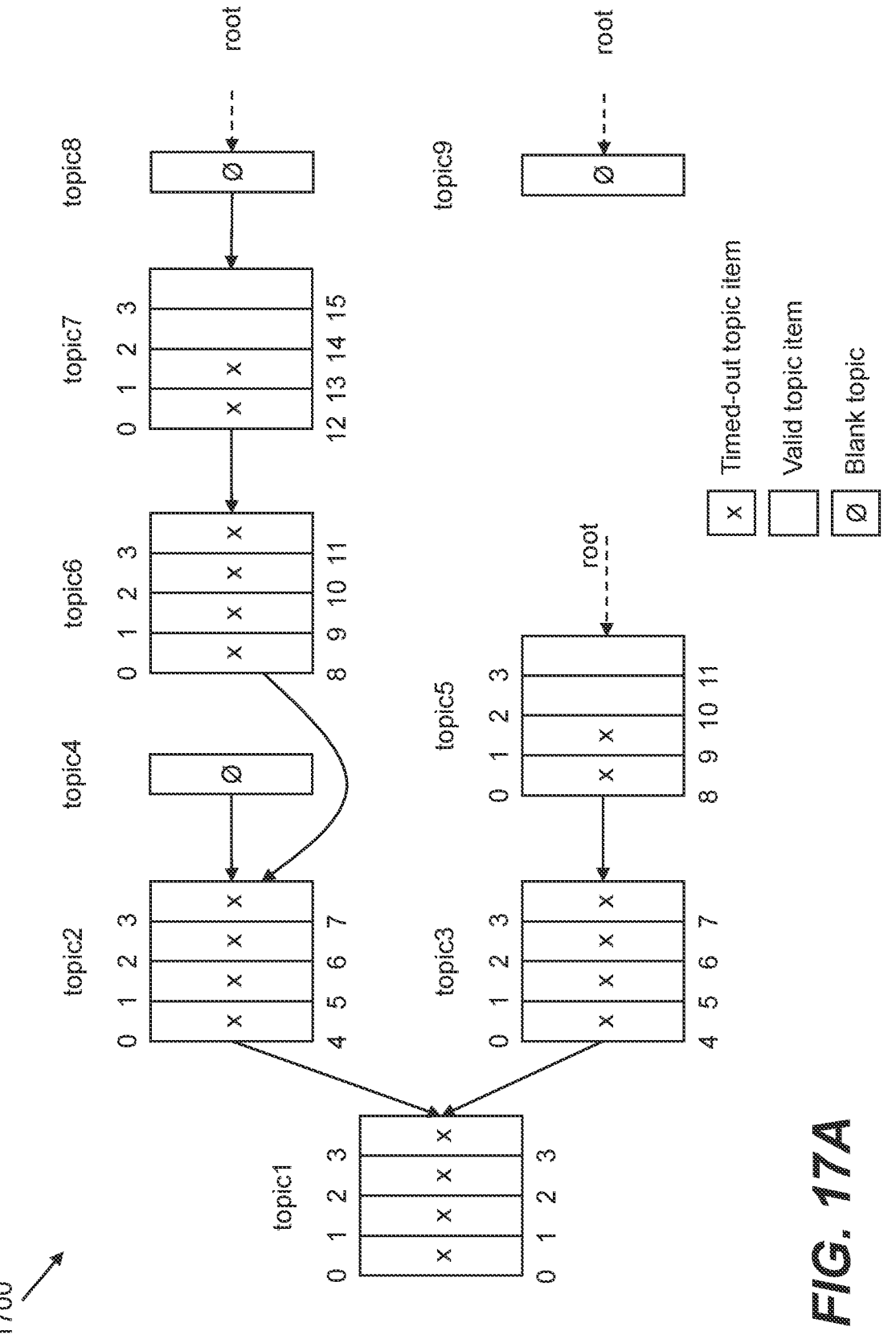
FIGS. 17A and 17B are graphs representing other example data queues.

FIG. 17A shows an example model queue 1700 eligible for clean-up. "topic1" is empty; all the items it contained have timed out. "topic1" has no ancestors, so all of its ancestors can be considered to be empty. "topic1" is a strict ancestor of "topic8", pointed to by a root. Therefore, "topic1" is eligible for clean-up. "topic2" is also empty. All of the ancestors of "topic2" (namely "topic1") are also empty. "topic2" is a strict ancestor of "topic8". Therefore, "topic2" is eligible for clean-up. "topic3" is also empty. All of the ancestors of "topic3" (namely "topic1") are also empty. "topic3" is also an ancestor of a topic (namely "topic5") pointed to by a root. Therefore, "topic3" is eligible for clean-up. "topic4" is empty. However, "topic4" is not an ancestor of any topic pointed to by a root. Therefore, "topic4" is not eligible for clean-up. "topic5" is not empty. Moreover, "topic5" is pointed to by a root. Therefore, "topic5" is not eligible for clean-up. "topic6" is empty, all of its ancestors (namely "topic1" and "topic2") are also empty, and "topic6" is a strict ancestor of "topic8", pointed to by a root. Therefore, "topic6" is eligible for clean-up. "topic7" is not empty. Therefore, "topic7" is not eligible for clean-up. "topic8" is empty. However, one of the ancestors of "topic8" (namely "topic7") is not empty and "topic8" is directly pointed to by a root. Therefore, "topic8" is not eligible for clean-up. "topic9" is empty. "topic9" has no ancestors, so ancestors of "topic9" are considered to be empty. However, "topic9" is directly pointed to by a root. Therefore, "topic9" is not eligible for clean-up.

Figure 17B:
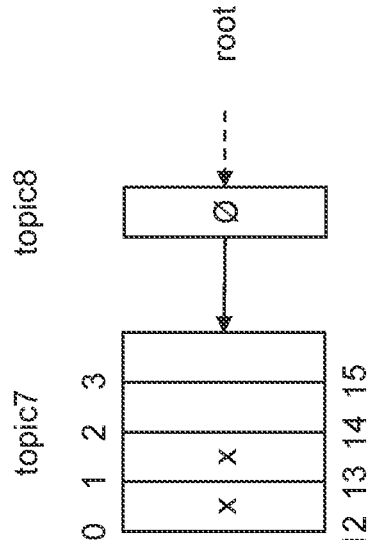
Figure 17B:
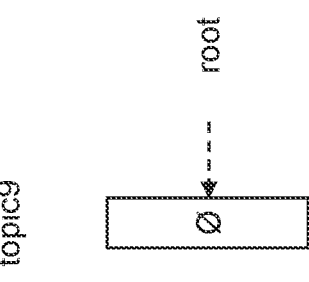
Figure 17B:
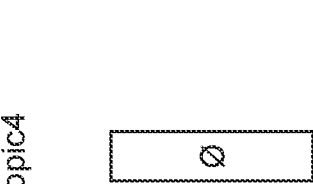
Figure 17B:
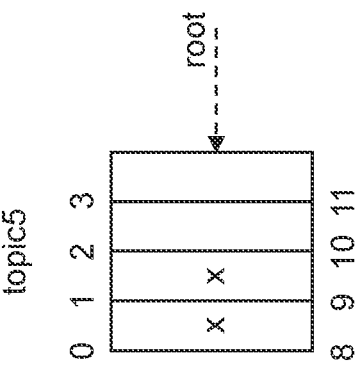

FIG. 17B shows an example model queue graph 1702 after the clean-up procedure has been completed. When a topic is completely blank (in other words, when it never contained any messages), such as "topic4" from the above example, its children will bypass it to directly reference its parent (if any). In this specific example, and in accordance with the example conditions set out above, such blank topics are not cleaned up. However, such topics should remain relatively rare. More generally, in this specific example, topics not reachable from the root are not cleaned up. However, in other examples, empty topics, such as "topic4" can be cleaned up.

As such, examples described herein provide the capability to have multiple independent sets of data stored in a data store (such as a database), with a hierarchical relationship.

A specific set of the data is accessed using a state id. In some examples, metadata is stored in the data store with information on the relationship between different state ids. However, as mentioned above, metadata is not necessarily stored in the same data store as state data. Relationships can be a parent relationship, or an overlay relationship. A single state id can have zero or one parents, and zero to "N" overlays. An external client accessing the data store does so using a specific root state id.

When saving data for a data item "E", with data elements "m1", "m2", "m3", the data is simply written into the root state, potentially overwriting anything else stored in the root state for "E", if it exists. A timestamp or other strictly incrementing number is also stored, indicating when the data was modified relative to other changes in the data store.

When reading, the client is looking for a specific data item, "E". If "E" is present in the root state, data stored in the root state in association with "E" is returned to the client. If not, then the parent state is searched, and so on up the parent hierarchy until "E" is found, or the state at the end (i.e. top) of the tree is searched, and "E" is determined not to be present.

Additionally, while searching, applicable overlays may be searched. When a state is applied as an overlay to another state, it is applied with at least one timestamp. In some examples, the overlay is applied with a first ("upper") timestamp, "u", indicating when the overlay was applied to the other state and may, optionally, be applied with a second ("lower") timestamp, "t" indicating when the overlay was created. Data indicating the set of data elements that should be applied from the overlay is also stored.

Once "E" has been found, its timestamp "$t_E$" is examined to determine which overlays should be applied. For all overlays for which $t < t_E <= u$, in chronological order based on upper timestamp, the data elements "$m_n$" from each overlay are applied. Such data elements may be copied over the data read from somewhere in the parent state hierarchy. The resulting data is then returned to the querying application. If "$t_E$" is greater than the upper timestamp of all existing overlays, then "E" has already been saved with the overlays applied, and so may be returned as-is. However, in examples, later overlays are still checked, in case such overlays changed how data items were resolved.

A clean-up operation can be run concurrently to client reads and writes. This collapses old states together, copying forward any data that does not exist in the target state, e.g. a root state. This uses an atomic insertion operation such that any data saved concurrently in the root state by a running client is not overwritten.

Techniques described herein may be implemented on top of Mongo, SQL, and Apache Kafka. Different implementation details may be involved.

The entire contents of a data set may be identified by listing all of the data items present in all data sets in a data store, or at least all data items in the hierarchy from a particular root, and then querying for each data item through root data set to see its effective data from that root.

Figure 18:
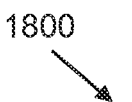
FIG. 18 is a state graph representing another example data store.
Figure 18:
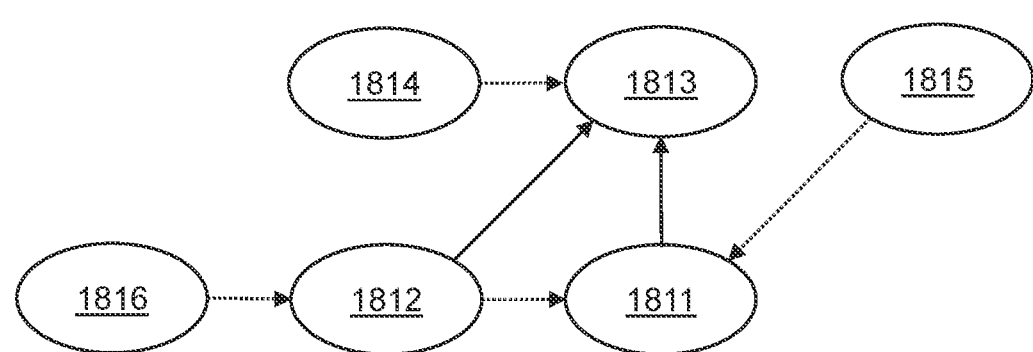

FIG. 18 shows another state graph 1800 representing another example data store. Reference will be made to the example state graph 1800 to summarise various features and effects of features described herein.

Various measures (for example, methods, apparatuses, systems, computer programs, and computer-readable media) are provided to search for data in a data store. The data store comprises a first data set 1811 and a second data set 1812. A data item is searched for in the first and/or second data sets 1811, 1812. In response to said searching finding the data item, data stored in association with the data item is returned. If the data item is found in the first data set 1811 and if the data item was updated in the first data set 1811 after the second data set 1812 became an overlay of the first data set 1811, said returning comprises returning first data stored in association with the data item in the first data set 1811. If the data item is found in the first and second data sets 1811, 1812 and if the second data set 1812 became an overlay of the first data set 1811 after the data item was updated in the first data set 1811, said returning comprises returning second data stored in association with the data item in the second data set 1812. The second data set 1812 is identified based on overlay metadata. The overlay metadata is indicative of the second data set 1812 being an overlay of the first data set 1811.

Various measures (for example, methods, apparatuses, systems, computer programs, and computer-readable media) are also provided to store data in a data store. The data store comprises first data set 1811 and a second data set 1812. Data is stored in association with a data item in the first and/or second data set 1811, 1812. The second data set 1812 is applied as an overlay of the first data set 1811. Overlay metadata is stored. The overlay metadata is indicative of the second data set 1812 being an overlay of the first data set 1811.

Such measures use an overlay and overlay metadata to facilitate searching for or retrieving a data item in a data store, where the data item may be in one or both of the first and second data sets 1811, 1812. The first and second data sets 1811, 1812 are separate data sets in that their data has not been merged into a single data set, but they are related via the overlay metadata. The amalgam of the first and second data sets 1811, 1812 in this manner enables effective data to be identified and returned from one or both of the first and second data sets 1811, 1812 without the first and second data sets 1811, 1812 having been merged. The overlay metadata is therefore a data structure controlling how a search operation is performed in the data store.

Such measures may improve query response times by enabling responses to be constructed using data from different (potentially very large) data sets, as compared to query responses having to be delayed while different (potentially very large) data sets are merged.

Such measures execute structured queries based on the data item to be searched for. Such queries may comprise or may otherwise identify the data item to be searched for. The data item may uniquely identify data to be retrieved from the data store.

Such measures may, particularly but not exclusively in combination with other features described herein, provide improved computational efficiency in terms of reducing memory read operations, provide improved security, provide improved scalability, provide improved throughput and/or provide improved data retention.

The first and second data sets 1811, 1812 may have different technical properties. For example, the first data set 1811 may be a root data set and the second data set 1812 may be a non-root data set. In such examples, data may be written to and read from the first data set 1811, while data may only be read from the second data set 1812.

In accordance with examples, live data may be stored separately from other data, such as test data. The test data may be applied to the live data as an overlay, without the test data needing to be copied over the live data in a single copy operation. In the case of a real-time transaction processing, transaction processing may continue based on the live data while test data can be created in parallel and applied where appropriate, without copying-related downtime. The live and test data can be created and written to independently until, for example, the test data is applied as an overlay.

In accordance with examples, copy-on-write historical snapshots may be provided. A child state can be created from an old state. Assuming they are available, the events can be replayed with a different machine learning configuration. The effect the changes would have had, compared to what happened, can then be seen. Those changes can be merged into the current live system without having to re-mature all the data again.

In some examples, the data item being searched for is associated with an entity in relation to which real-time anomaly detection is being performed. As explained above, measures provided herein can reduce query response times, which may be especially effective in the context of real-time anomaly detection.

In some examples, the data in the data store comprises parameter data and/or state data for a machine learning model.

In some examples, if the second data is returned, the second data is caused to be stored in association with the data item in the first data set 1811. The search for the data may initially start in the first data set 1811. In such cases, in future searches for the data item, the second data may be retrieved from the first data set 1811. This can reduce searching and response times compared to searching both the first and second data sets 1811, 1812 for the data item, as an additional read operation to read data from the second data set 1812 may not be needed.

In some examples, the second data is caused to be stored in association with the data item in the first data set 1811 in addition to the first data being stored in association with the data item in the first data set 1811. Such examples enable selective retention of the first data, in contrast to the first data being overwritten by the second data. This can be especially effective in examples in which the data comprises machine learning model data, since machine learning model data can be used in a live data set (for example the first data set 1811) and machine learning model data can be tested in a test data set (for example the second data set 1812); effective machine learning model data in the live data set may selectively be retained, while machine learning model data in the test data set which is found to be effective in a test setting may be applied in combination with the machine learning model data in a live setting.

In some examples, timestamp data is caused to be stored in the data store. The timestamp data may be indicative of when the second data was stored in association with the data item in the first data set 1811. The timestamp data may indicate whether future searching for the data item should include other data sets in addition to the first data set 1811. For example, if the timestamp data indicates that the second data was stored in association with the data item in the first data set 1811 after any overlay data sets were applied to the first data set 1811, future searching for the data item may not need to include any such other overlay data sets. This, in turn, can reduce query response times and can reduce the number of read operations involved in returning the effective data associated with the data item.

In some examples, the second data set 1812 comprises further data. The further data may not be caused to be stored in the first data set 1811 concurrently with the second data item being stored in association with the data item in the first data set 1811. In contrast to techniques in which all data in the second data set 1812 would be concurrently copied into the first data set 1811, such examples enable data to be stored in the data set 1811 on an as-needed basis.

In some such examples, the further data is stored in association with the data item in the second set 1812. Overlay data element selection metadata may be indicative that the second data is to be stored in association with the data item in the first data set 1811 and that the further data is not to be stored in association with the data item in the first data set 1811. Based on the overlay data element selection data, the further data may be inhibited from being stored in association with the data item in the first data set 1811. Such examples provide a reliable and precisely defined indication of the effective data that is to be constructed in the first data set 1811 at a data element level.

In other such examples, the further data is stored in association with a further data item in the second data set 1812. Again, in contrast to techniques in which all data in the second data set 1812 would be concurrently copied into the first data set 1811, such examples enable data to be stored in the data set 1811 on an as-needed basis at a data item level.

In some examples, the first data set 1811 is a child data set. The data store may further comprise a third data set 1813. The third data set 1813 may be a parent of the first data set 1811. Such examples enable separation of data on a temporal basis. For example, the third (parent) data set 1813 may comprise historical data, whereas the first (child) data set 1811 may comprise newer, for example current, data. In some examples, the first data set 1811 potentially comprises data not comprised in the third data set 1813. As such, the third (parent) data set 1813 may comprise historical data, whereas the first (child) data set 1811 may comprise newer, for example current, data not in the historical data. This differs from other data store configurations in which a child data set comprises a subset of the data of a parent data set.

In some examples, in response to said searching not finding the data item in the first data set 1811, the data item is searched for in the third data set 1813. The third data set 1813 may be identified using parent metadata. The parent metadata may be indicative of the third data set 1813 being a parent of the first data set 1811. The parent metadata enables the third data set 1813 to be searched without the potentially large amount of data in the third data set 1813 having been copied into the first data set 1811.

In some examples, the data store further comprises a data set 1814 that is an overlay of the third data set 1813. The data item may be searched for in the data set 1814 that is an overlay of the third data set 1813. This can improve accuracy in the system in that, for example, multiple different test data sets can be applied as overlays to the first data set 1811, with especially effective data from the different test data sets being selectively applied.

In some examples, such as shown in FIG. 18, the third data set 1813 is also a parent of the second data set 1812. As such multiple different potentially diverging data sets can be derived from and share common parent data.

In other examples, which are not shown in FIG. 18, the third data set 1813 is not a parent of the second data set 1812. As such, an independent data set can be used, for example for data maturation. The fifth data set 1815 shown in FIG. 18 is an example of an overlay of the first data set 1811 which does not share a common parent with the first data set 1811.

In some examples, the third data set 1813 became immutable on creation of the first data set 1811 and/or the second data set 1812. As such, a historic record of data can be preserved.

In some examples, the second data set 1812 became immutable on becoming an overlay of the first data set 1811. Additionally, new data writes may be limited to a live data set.

In some examples, a clean-up operation is performed on a given data set in the data store. The clean-up operation may comprise causing data from another data set to be written into the given data set. The clean-up operation may comprise causing metadata indicative of a link between the other data set and the given data set to be removed. The clean-up operation may comprise causing the other data set to be removed from the data store. Such examples can reduce search query times by reducing the number of read operations to return a positive or negative search result.

In some examples, the first data set 1811 was empty on creation of the first data set 1811. In some examples, the second data set 1812 was empty on creation of the second data set 1812. In examples, in which the first and/or second data set 1811, 1812 is a child of another data set, the first and/or second data set 1811, 1812 can be created quickly as an empty set, with the amalgam of the first and/or second data set 1811, 1812 and its parent data set still effectively providing access to the (potentially historic) data of the parent data set.

In some examples, the data store further comprises a data set 1815 that became an overlay of the first data set 1811 before the second data set 1812 became an overlay of the first data set 1811. The second data may be returned in preference to returning data stored in association with the data item in the data set 1815 that became an overlay of the first data set 1811 before the second data set 1812 became an overlay of the first data set 1811. As such, most recently updated data may be used.

In some examples, the data store further comprises a data set 1816 that is an overlay of the second data set 1812. The data item may be searched for in the data set 1816 that is an overlay of the second data set 1812. As such, recursive overlays may be searched.

In some examples, if the data item is not found in the first data set 1811 and if the data item is found in the second data set 1812, said returning comprises returning the second data stored in association with the data item in the second data set 1812. As such, processing may be performed where an overlay adds a data item that was not present in a live data set, for example where the data item only exists in the overlay and does not exist in the first data set 1811.

In some examples, a deletion marker associated with given data stored in the data store is identified. Returning of the given data may be inhibited on the basis of the deletion marker. As such, an effective technique for data being regarded as deleted can be provided, while such data can still be retained with the data store for other purposes.

Various measures (for example, methods, apparatuses, systems, computer programs, and computer-readable media) are also provided to search for machine learning model data in a database. The database comprises live state 1811 and an overlay state 1812. A key is searched for in the live and/or overlay state 1811, 1812. The key is associated with one or more entities in relation to which real-time anomaly detection is being performed. In response to said searching finding the key, machine learning model data stored in association with the key is returned. The machine learning model data comprises parameter data and/or state data for a machine learning model to be used to perform said real-time anomaly detection. If the key is found in the live state 1811 and if the key was updated in the live state 1811 after the overlay state 1812 became an overlay of the live state 1811, said returning comprises returning first machine learning model data stored in association with the key in the live state 1811. If the key is found in the live and overlay states 1811, 1812 and if the overlay state 1812 became an overlay of the live state 1811 after the key was updated in the live state 1811, said returning comprises returning second machine learning model data stored in association with the key in the overlay state 1812. The overlay state 1812 is identified based on overlay metadata. The overlay metadata is indicative of the overlay state 1812 being an overlay of the live state 1811.

In examples described above, a root data set is searched for a data item and, (only) if the data item is not found in the root data set, another data set is then identified using metadata and searched for the data item. In such examples, the other data set is only read if it is to be searched. In other examples, the root data set and the other data set are read before it has been determined whether the other data set needs to be searched for the data item.

Certain examples described herein may be implemented via instructions that are stored within a computer-readable storage medium, such as a non-transitory computer-readable medium. The computer readable medium may comprise one or more of a rotating magnetic disk, a rotating optical disk, a flash random access memory (RAM) chip, and other mechanically moving or solid-state storage media. In use, the instructions are executed by one or more of processors to cause said processor to perform the operations described above. The above embodiments, variations and examples are to be understood as illustrative. Further embodiments, variations and examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

What is claimed is:

1. A computer-implemented method, comprising:
   searching in real-time for data in a data store, wherein the data comprises at least one of parameter data or state data for a machine learning model in a machine learning system configured to perform anomaly detection, the data store comprising:
   a first data set; and
   a second data set,
   wherein, at a point in time after both the first data set and the second data set have been created and first stored in the data store, the second data set is applied as an overlay data set to the first data set, wherein the first data set is linked to the second data set through overlay metadata, the overlay metadata comprising information on both the second data set being the overlay data set of the first data set and the time at which the second data set became the overlay data set of the first data set;
   wherein the step of searching in real-time comprises:
   searching for a data item in the first and/or second data sets; and
   in response to said searching finding the data item, returning data stored in association with the data item,
   wherein, if the data item is found in the first data set and if the data item was updated in the first data set after the second data set became the overlay data set of the first data set, said returning comprises returning first data stored in association with the data item in the first data set,
   wherein, if the data item is found in the first and second data sets and if the second data set became the overlay data set of the first data set after the data item was updated in the first data set, said returning comprises returning second data stored in association with the data item in the second data set, and
   identifying the second data set based on overlay metadata, the overlay metadata being indicative of the second data set being an overlay data set of the first data set.

2. The method of claim 1, wherein the data item is associated with an entity in relation to which real-time anomaly detection is being performed.

3. The method of claim 1, wherein, if the second data is returned, the method comprises causing the second data to be stored in association with the data item in the first data set.

4. The method of claim 3, wherein said causing comprises causing the second data to be stored in association with the data item in the first data set in addition to the first data being stored in association with the data item in the first data set.

5. The method of claim 4, comprising causing timestamp data to be stored in the data store, the timestamp data being indicative of when the second data was stored in association with the data item in the first data set.

6. The method of claim 1, wherein the second data set comprises further data and wherein the further data is not caused to be stored in the first data set concurrently with the second data item being stored in association with the data item in the first data set.

7. The method of claim 6, wherein the further data is stored in association with the data item in the second set, wherein overlay data element selection metadata is indicative that the second data is to be stored in association with the data item in the first data set and that the further data is not to be stored in association with the data item in the first data set, and wherein the method comprises inhibiting, based on the overlay data element selection metadata, the further data from being stored in association with the data item in the first data set.

8. The method of claim 6, wherein the further data is stored in association with a further data item in the second data set.

9. The method of claim 1, wherein the first data set is a child data set, wherein the data store further comprises a third data set, and wherein the third data set is a parent of the first data set.

10. The method of claim 9, wherein the first data set potentially comprises data not comprised in the third data set.

11. The method of claim 9, wherein in response to said searching not finding the data item in the first data set, the method comprises searching for the data item in the third data set,
    wherein the third data is identified set using parent metadata, and
    wherein the parent metadata is indicative of the third data set being a parent of the first data set.

12. The method of claim 11, wherein the data store further comprises a data set that is an overlay of the third data set, and wherein the method comprises searching for the data item in the data set that is an overlay of the third data set.

13. The method of claim 9, wherein the third data set is also a parent of the second data set.

14. The method of claim 9, wherein the third data set is not a parent of the second data set.

15. The method of claim 9, wherein the third data set became immutable on creation of the first and/or second data set.

16. The method of claim 1, wherein the second data set became immutable on becoming the overlay data set of the first data set.

17. The method of claim 1, comprising performing a clean-up operation on a given data set in the data store, wherein, the clean-up operation comprises:
    causing data from another data set to be written into the given data set;
    causing metadata indicative of a link between the other data set and the given data set to be removed; and
    causing the other data set to be removed from the data store.

18. The method of claim 1, wherein the first data set was empty on creation of the first data set and/or wherein the second data set was empty on creation of the second data set.

19. The method of claim 1, wherein the data store further comprises:
    a data set that became an overlay data set of the first data set before the second data set became the overlay data set of the first data set, and wherein the method comprises returning the second data in preference to returning data stored in association with the data item in the data set that became the overlay data set of the first data set before the second data set became the overlay data set of the first data set; and/or
    a data set that is an overlay data set of the second data set, and wherein the method comprises searching for the data item in the data set that is the overlay data set of the second data set.

20. The method of claim 1, wherein, if the data item is not found in the first data set and if the data item is found in the second data set, said returning comprises returning the second data stored in association with the data item in the second data set.

21. The method of claim 1, comprising:
    identifying a deletion marker associated with given data stored in the data store; and
    inhibiting returning of the given data on the basis of the deletion marker.

22. A computer-implemented method, comprising:
    storing data in a data store, wherein the data comprises at least one of parameter data or state data for a machine learning model in a machine learning system configured to perform anomaly detection, the data store comprising:
    a first data set; and
    a second data set,
    wherein, at a point in time after both the first data set and the second data set have been created and first stored in the data store, the second data set is applied as an overlay data set to the first data set, wherein the first data set is linked to the second data set through overlay metadata, the overlay metadata comprising information on both the second data set being the overlay data set of the first data set and the time at which the second data set became the overlay data set of the first data set;
    wherein the step of storing comprises:
    storing data in association with a data item in the first and/or second data set;
    applying the second data set as the overlay data set of the first data set; and
    storing overlay metadata, the overlay metadata being indicative of the second data set being an overlay data set of the first data set.

23. A computer-implemented method, comprising:
    searching in real-time for machine learning model data in a database, wherein the data comprises at least one of parameter data or state data for a machine learning model in a machine learning system configured to perform anomaly detection, the database comprising:
    live state; and
    an overlay state,
    wherein, at a point in time after both the live state and the overlay state have been created and first stored in the database, the overlay state is applied as an overlay data set to the live state, wherein the live state is linked to the overlay state through overlay metadata, the overlay metadata comprising information on both the overlay state being the overlay data set of the live state and the time at which the overlay state became the overlay data set of the live state;
    wherein the step of searching comprises:
    searching for a key in the live and/or overlay state, the key being associated with one or more entities in relation to which real-time anomaly detection is being performed; and
    in response to said searching finding the key, returning machine learning model data stored in association with the key, the machine learning model data comprising parameter data and/or state data for a machine learning model to be used to perform said real-time anomaly detection, wherein, if the key is found in the live state and if the key was updated in the live state after the overlay state became the overlay data set of the live state, said returning comprises returning first machine learning model data stored in association with the key in the live state, wherein, if the key is found in the live and overlay states and if the overlay state became the overlay data set of the live state after the key was updated in the live state, said returning comprises returning second machine learning model data stored in association with the key in the overlay state, and identifying the overlay state based on overlay metadata, the overlay metadata being indicative of the overlay state being an overlay data set of the live state.

* * * * *